United States Patent [19]
Ogura

[11] Patent Number: 5,893,005
[45] Date of Patent: Apr. 6, 1999

[54] IMAGE FORMING APPARATUS ADMINISTRATION SYSTEM INCLUDING A COMMUNICATION CONTROL UNIT AND AN ADMINISTRATING DEVICE

[75] Inventor: Masaaki Ogura, Kawasaki, Japan

[73] Assignee: Ricoh Company, Ltd., Tokyo, Japan

[21] Appl. No.: 737,606

[22] PCT Filed: Mar. 29, 1996

[86] PCT No.: PCT/JP96/00841

§ 371 Date: Nov. 26, 1996

§ 102(e) Date: Nov. 26, 1996

[87] PCT Pub. No.: WO96/30813

PCT Pub. Date: Oct. 3, 1996

[30] Foreign Application Priority Data

Mar. 31, 1995 [JP] Japan .................................. 7-076260
Oct. 27, 1995 [JP] Japan .................................. 7-280200

[51] Int. Cl.[6] .......................... G03G 15/00; G03G 21/00
[52] U.S. Cl. ................................................................ 399/11
[58] Field of Search ........................................... 399/8, 11

[56] References Cited

U.S. PATENT DOCUMENTS 5,303,005  4/1994  Takano et al. .............................. 399/8
5,446,522  8/1995  Tahara et al. .............................. 399/8
5,543,892  8/1996  Hirata et al. .............................. 399/8

*Primary Examiner*—Fred L. Braun
*Attorney, Agent, or Firm*—Oblon, Spivak, McClelland, Maier & Neustadt, P.C.

[57] ABSTRACT

Work start data is transmitted to an administrating device (a service center) by a work start data transmitting mechanism when an instruction for start of a maintenance work is issued from a work start instructing mechanism, and work end data is transmitted to the administrating device by a work end data transmitting mechanism when an instruction for end of the maintenance work is issued from a work end instruction mechanism. Also time measurement is started by a time measuring mechanism when an instruction for start of a maintenance work is issued from the work start instructing mechanism, and in a case where, even if the measured time reaches a prespecified period of time, an instruction for end of the maintenance work is not issued from the work end instructing mechanism, work end data is automatically transmitted by a work end data automatically transmitting mechanism to the administrating device. For the reasons as described above, reporting from a serviceman to a service center before start of or after end of a maintenance work for an image forming apparatus at a customer's site can be smoothly executed.

11 Claims, 44 Drawing Sheets

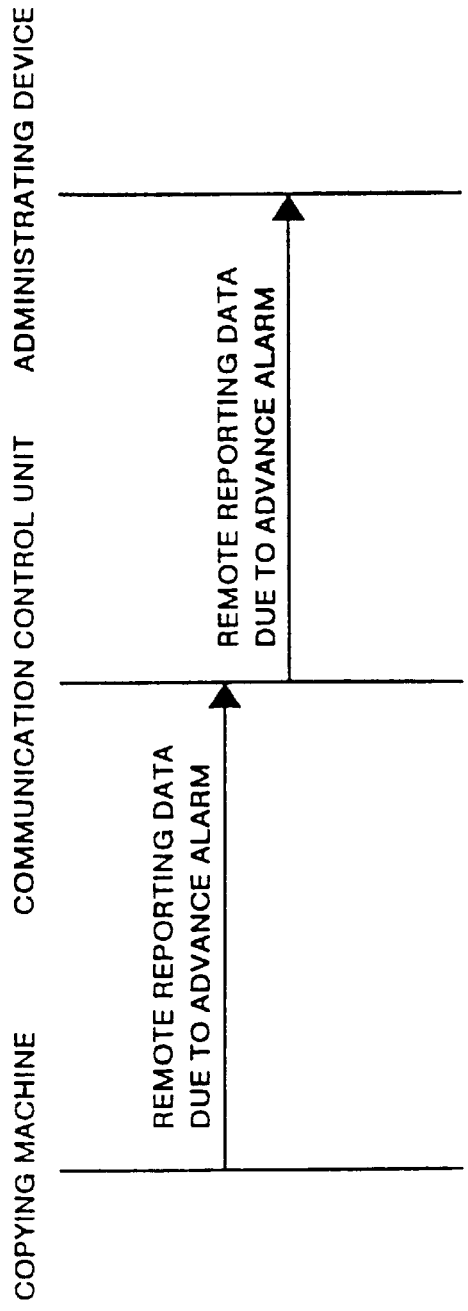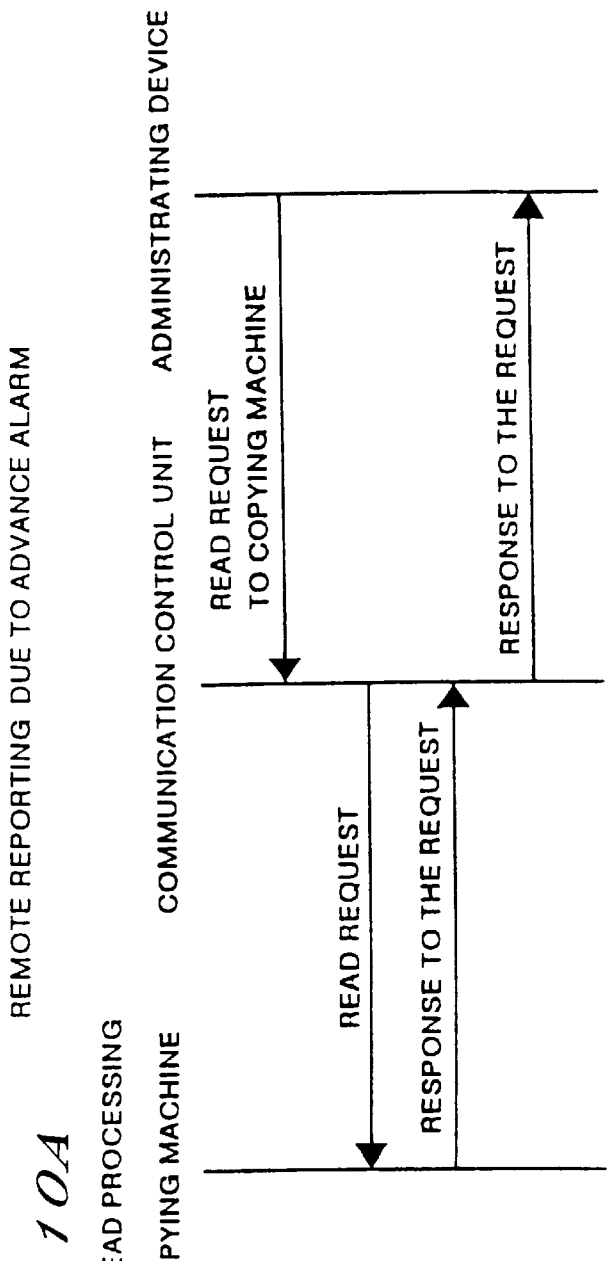

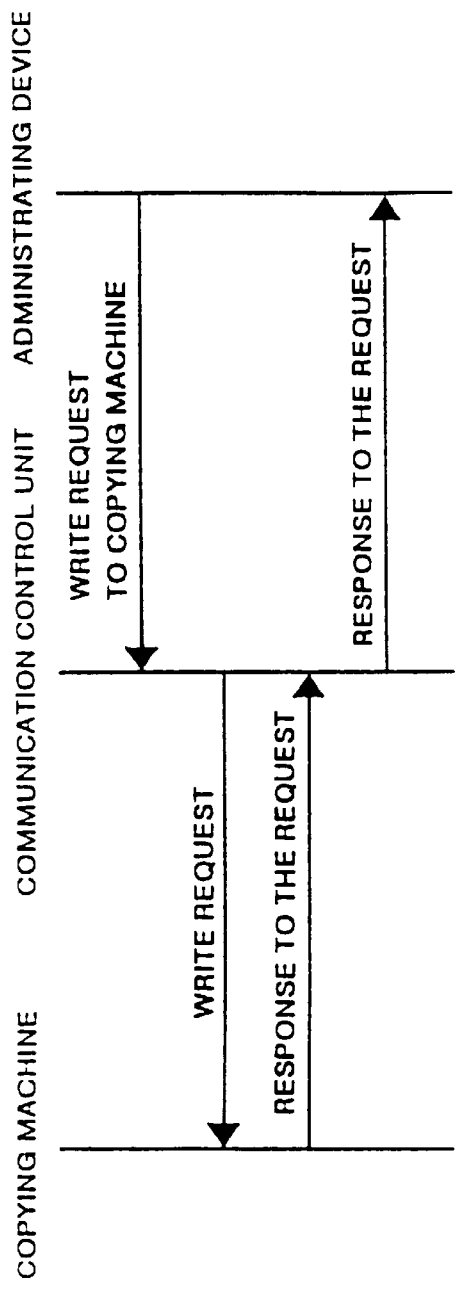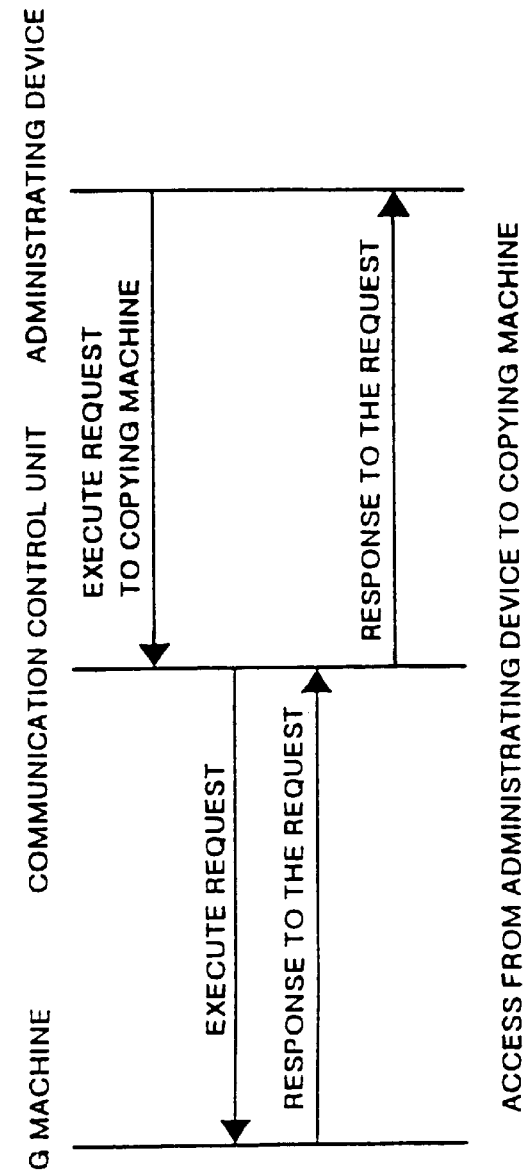
*FIG. 10B* WRITE PROCESSING
*FIG. 10C* EXECUTE PROCESSING

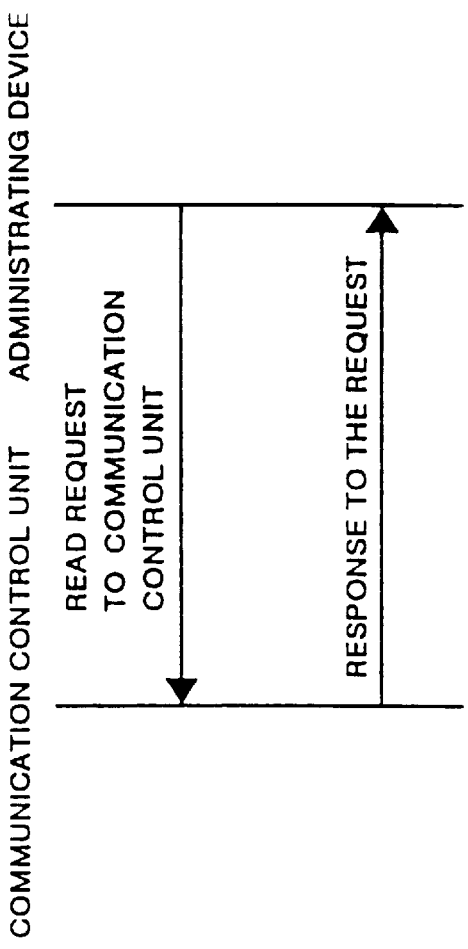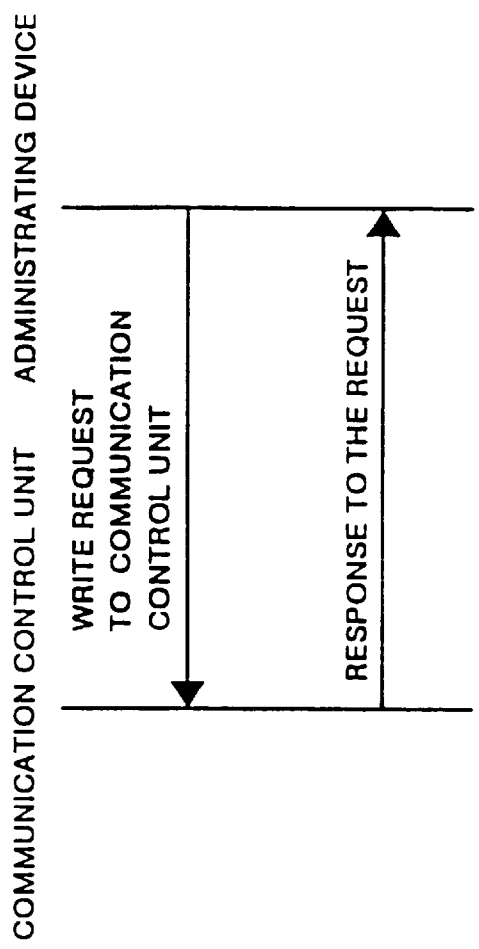

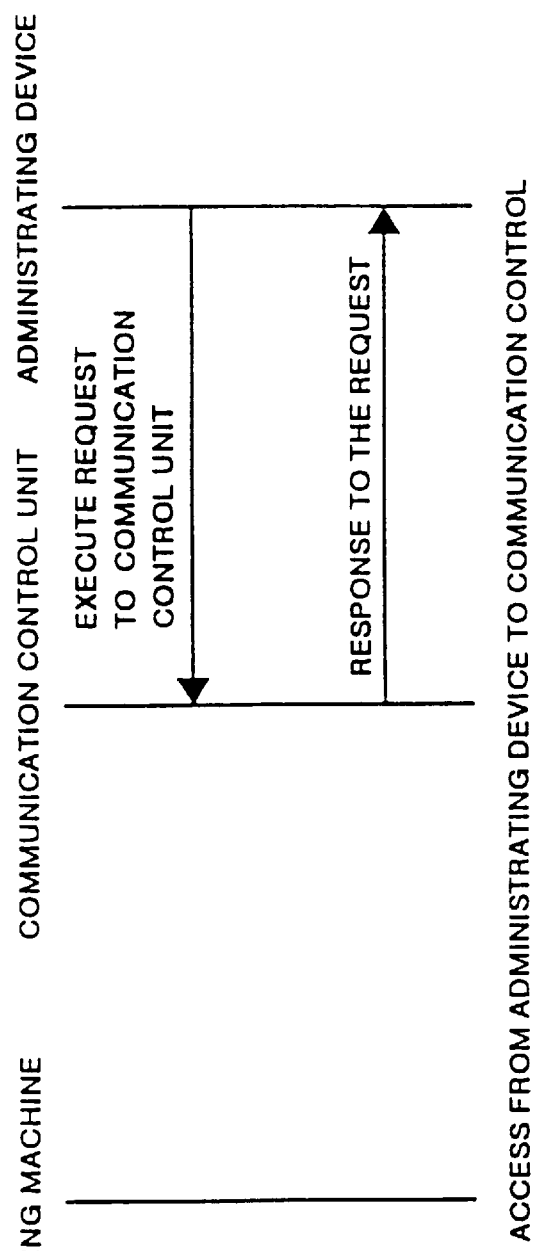

FIG. 13A

| CONTENTS OF PARAMETERS | | LENGTH OF DATA |
|---|---|---|
| COPYING MACHINE AT ADDRESS 1 | MODEL NUMBER | 6 |
| | SERIAL NUMBER | 10 |
| | CHECK-SUM FOR THE ABOVE ITEMS | 4 |
| COPYING MACHINE AT ADDRESS 2 | MODEL NUMBER | 6 |
| | SERIAL NUMBER | 10 |
| | CHECK-SUM FOR THE ABOVE ITEMS | 4 |
| COPYING MACHINE AT ADDRESS 3 | MODEL NUMBER | 6 |
| | SERIAL NUMBER | 10 |
| | CHECK-SUM FOR THE ABOVE ITEMS | 4 |
| COPYING MACHINE AT ADDRESS 4 | MODEL NUMBER | 6 |
| | SERIAL NUMBER | 10 |
| | CHECK-SUM FOR THE ABOVE ITEMS | 4 |
| COPYING MACHINE AT ADDRESS 5 | MODEL NUMBER | 6 |
| | SERIAL NUMBER | 10 |
| | CHECK-SUM FOR THE ABOVE ITEMS | 4 |

FIG. 13B

| | | | |
|---|---|---|---|
| REMOTE REPORTING WITH REMOTE REPORTING KEY | TELEPHONE NUMBER OF DESTINATION FOR REPORTING | | 32 |
| | TIMES OF REDIALING | | 2 |
| | INTERVAL BETWEEN OPERATIONS FOR REDIALING | | 3 |
| | DATA TRANSMISSION ALLOWABLE WHEN REPORTING TO ADMINISTRATING DEVICE? | TIMES OF GENERATION OF JAMMING | 1 |
| | | TIMES OF GENERATION OF ABNORMALITY IN SELF-DIAGNOSIS | 1 |
| | | NUMBER OF COPIED SHEETS | 1 |
| | | STATE OF COPYING MACHINE | 1 |
| | CHECK-SUM FOR THE ABOVE ITEMS | | 4 |
| REMOTE REPORTING DUE TO ABNORMALITY IN SELF-DIAGNOSIS | TELEPHONE NUMBER OF DESTINATION FOR REPORTING | | 32 |
| | TIMES OF REDIALING | | 2 |
| | INTERVAL BETWEEN OPERATIONS FOR REDIALING | | 3 |
| | DATA TRANSMISSION ALLOWABLE WHEN REPORTING TO ADMINISTRATING DEVICE? | TIMES OF GENERATION OF JAMMING | 1 |
| | | TIMES OF GENERATION OF ABNORMALITY IN SELF-DIAGNOSIS | 1 |
| | | NUMBER OF COPIED SHEETS | 1 |
| | | STATE OF COPYING MACHINE | 1 |
| | CHECK-SUM FOR THE ABOVE ITEMS | | 4 |

FIG. 13C

| | | | |
|---|---|---|---|
| REMOTE REPORTING FOR ADVANCE ALARM | TELEPHONE NUMBER OF DESTINATION FOR REPORTING | | 32 |
| | TIMES OF REDIALING | | 2 |
| | INTERVAL BETWEEN OPERATIONS FOR REDIALING | | 3 |
| | DATA TRANSMISSION ALLOWABLE WHEN REPORTING TO ADMINISTRATING DEVICE? | TIMES OF GENERATION OF JAMMING | 1 |
| | | TIMES OF GENERATION OF ABNORMALITY IN SELF-DIAGNOSIS | 1 |
| | | NUMBER OF COPIED SHEETS | 1 |
| | | STATE OF COPYING MACHINE | 1 |
| | TIME FOR REPORTING TO ADMINISTRATING DEVICE (O'CLOCK, MINUTE) | | 4 |
| | CHECK-SUM FOR THE ABOVE ITEMS | | 4 |
| TOTAL COUNTER VALUE AUTOMATIC COMMUNICATION PROCESSING | TIME FOR CALCULATING A TOTAL COPY SHEET NUMBER COUNTER VALUE | | 4 |
| | TELEPHONE NUMBER OF DESTINATION FOR REPORTING | | 32 |
| | TIMING FOR REPORTING (DATE, O'CLOCK, MINUTE) | | 6 |
| | CHECK-SUM FOR THE ABOVE ITEMS | | 4 |
| TELEPHONE SETTING | DIAL MODE SETTING (PULSE OR TONE) | | 1 |
| | DIAL PULSE INTERVAL SETTING | | 1 |
| | CHECK-SUM FOR THE ABOVE ITEMS | | 4 |

FIG. 14A
REPORTING DATA FROM COPYING MACHINE TO COMMUNICATION CONTROL UNIT

| REPORTING REASON CODE | TIMES OF GENERATION OF JAMMING | | | | TIMES OF GENERATION OF ABNORMALITY IN SELF-DIAGNOSIS | | | | NUMBER OF COPIED SHEET | | | | STATE OF COPYING MACHINE | | |
|---|---|---|---|---|---|---|---|---|---|---|---|---|---|---|---|
| | TOTAL | SITE A | SITE B | ... | TOTAL | TYPE A | TYPE B | ... | TOTAL | SIZE A | SIZE B | ... | STATE A | STATE B | STATE C ... |

FIG. 14B
REPORTING DATA FROM COMMUNICATION CONTROL UNIT TO ADMINISTRATING DEVICE

| MODEL NUMBER | SERIAL NUMBER | REPORTING REASON CODE | TIME OF GENERATION OF ABNORMALITY IN SELF-DIAGNOSIS | | | | STATE OF COPYING MACHINE | | | TIME OF GENERATION |
|---|---|---|---|---|---|---|---|---|---|---|
| | | | TOTAL | TYPE A | TYPE B | ... | STATE A | STATE B | STATE C ... | |

FIG. 14C
REPORTING RESULT REPORT FROM COMMUNICATION CONTROL UNIT TO COPYING MACHINE

| REPORTING RESULT REPORT CODE | CONTENTS OF REPORTING RESULT REPORT |
|---|---|

EXAMPLE OF DATA FORMAT FOR REMOTE REPORTING

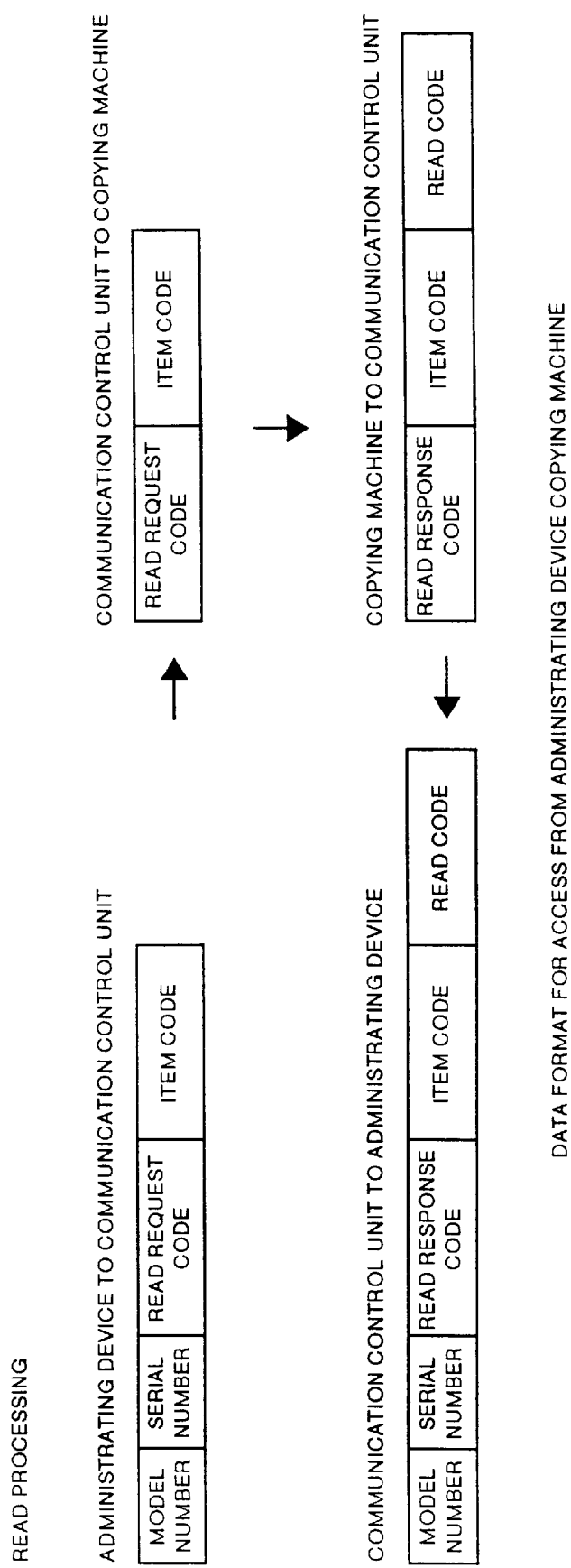

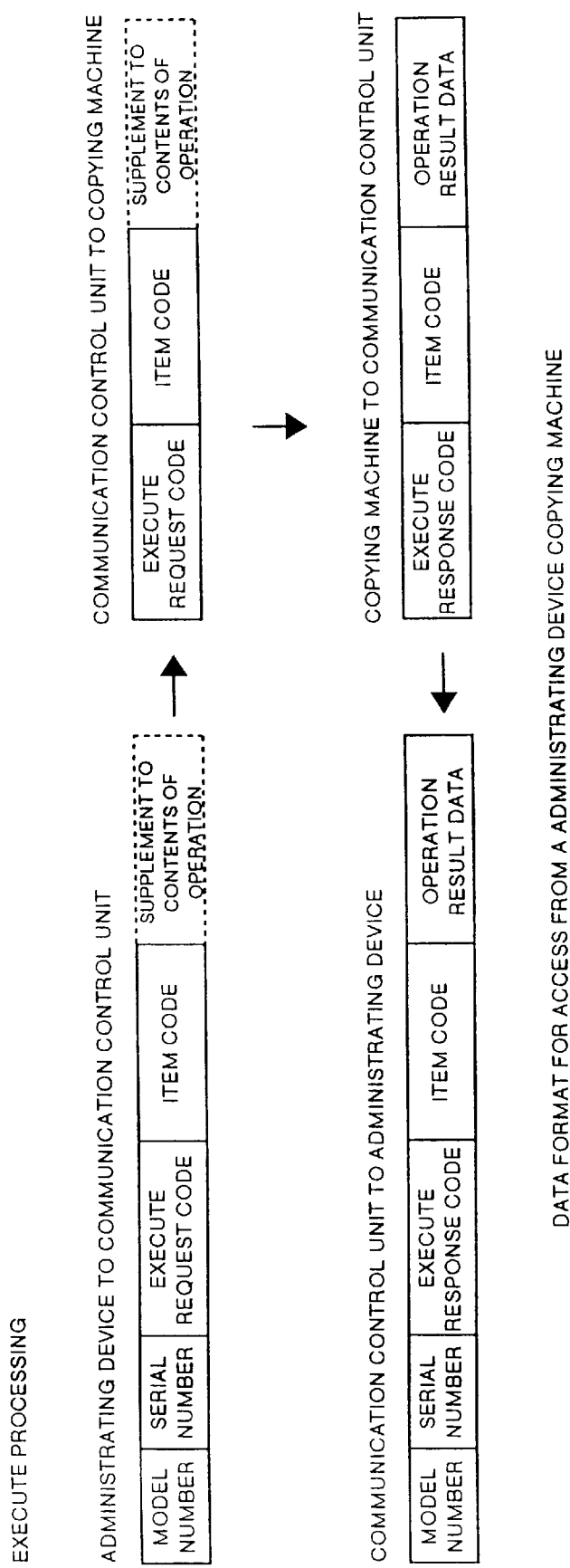

FIG. 18A

READ PROCESSING

ACCESS TO COMMUNICATION CONTROL UNIT

| COMMUNICATION CONTROL UNIT CODE | READ REQUEST CODE | ITEM CODE |

RESPONSE FROM COMMUNICATION CONTROL UNIT

| COMMUNICATION CONTROL UNIT CODE | READ RESPONSE CODE | ITEM CODE | READ DATA |

FIG. 18B

WRITE PROCESSING

ACCESS TO COMMUNICATION CONTROL UNIT

| COMMUNICATION CONTROL UNIT CODE | WRITE REQUEST CODE | ITEM CODE | DATA TO BE WRITTEN |

RESPONSE FROM COMMUNICATION CONTROL UNIT

| COMMUNICATION CONTROL UNIT CODE | WRITE RESPONSE CODE | ITEM CODE | WRITTEN DATA |

FIG. 18C

EXECUTE PROCESSING

ACCESS TO COMMUNICATION CONTROL UNIT

| COMMUNICATION CONTROL UNIT CODE | EXECUTE REQUEST CODE | ITEM CODE | SUPPLEMENT TO OPERATION CONTENTS |
|---|---|---|---|

RESPONSE FROM COMMUNICATION CONTROL UNIT

| COMMUNICATION CONTROL UNIT CODE | EXECUTE RESPONSE CODE | ITEM CODE | OPERATION RESULT DATA |
|---|---|---|---|

DATA FORMAT FOR ACCESS FROM ADMINISTRATING DEVICE TO COMMUNICATION CONTROL UNIT

FIG. 19
ACCESS FROM COMMUNICATION CONTROL UNIT TO COPYING MACHINE
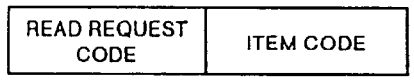
RESPONSE FROM COPYING MACHINE TO COMMUNICATION CONTROL UNIT
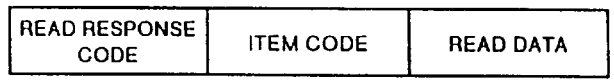
DATA FORMAT FOR ACCESS FROM COMMUNICATION CONTROL UNIT TO COPYING MACHINE
FIG. 20
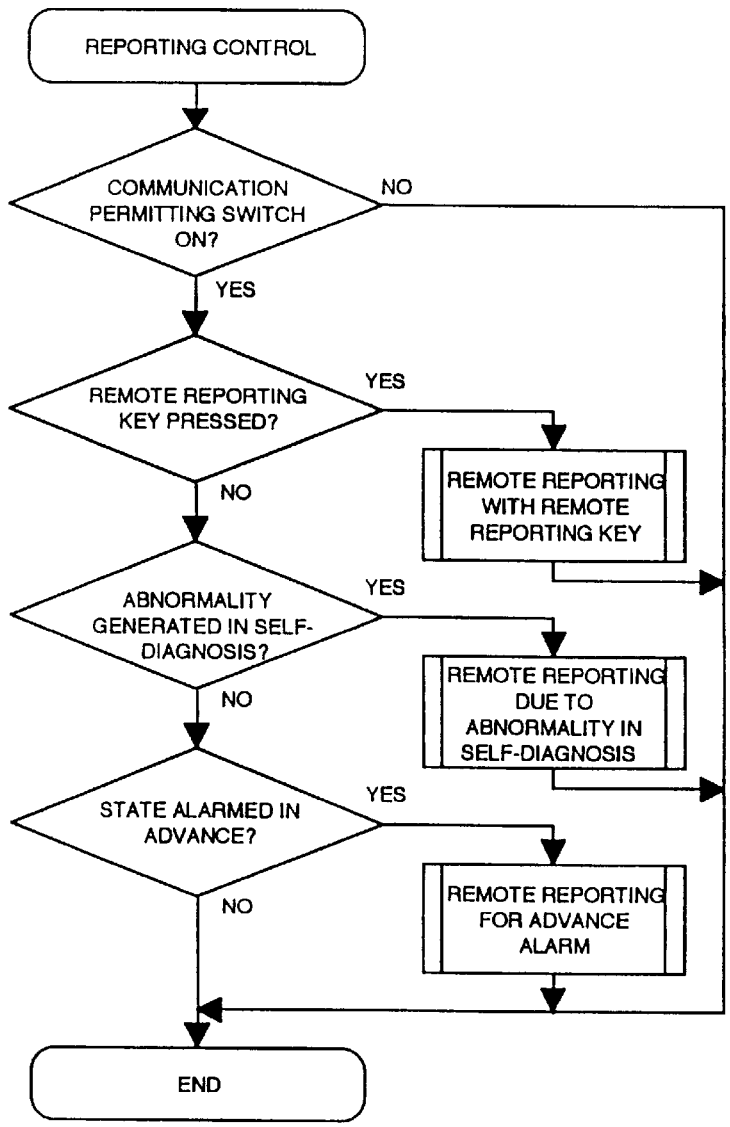

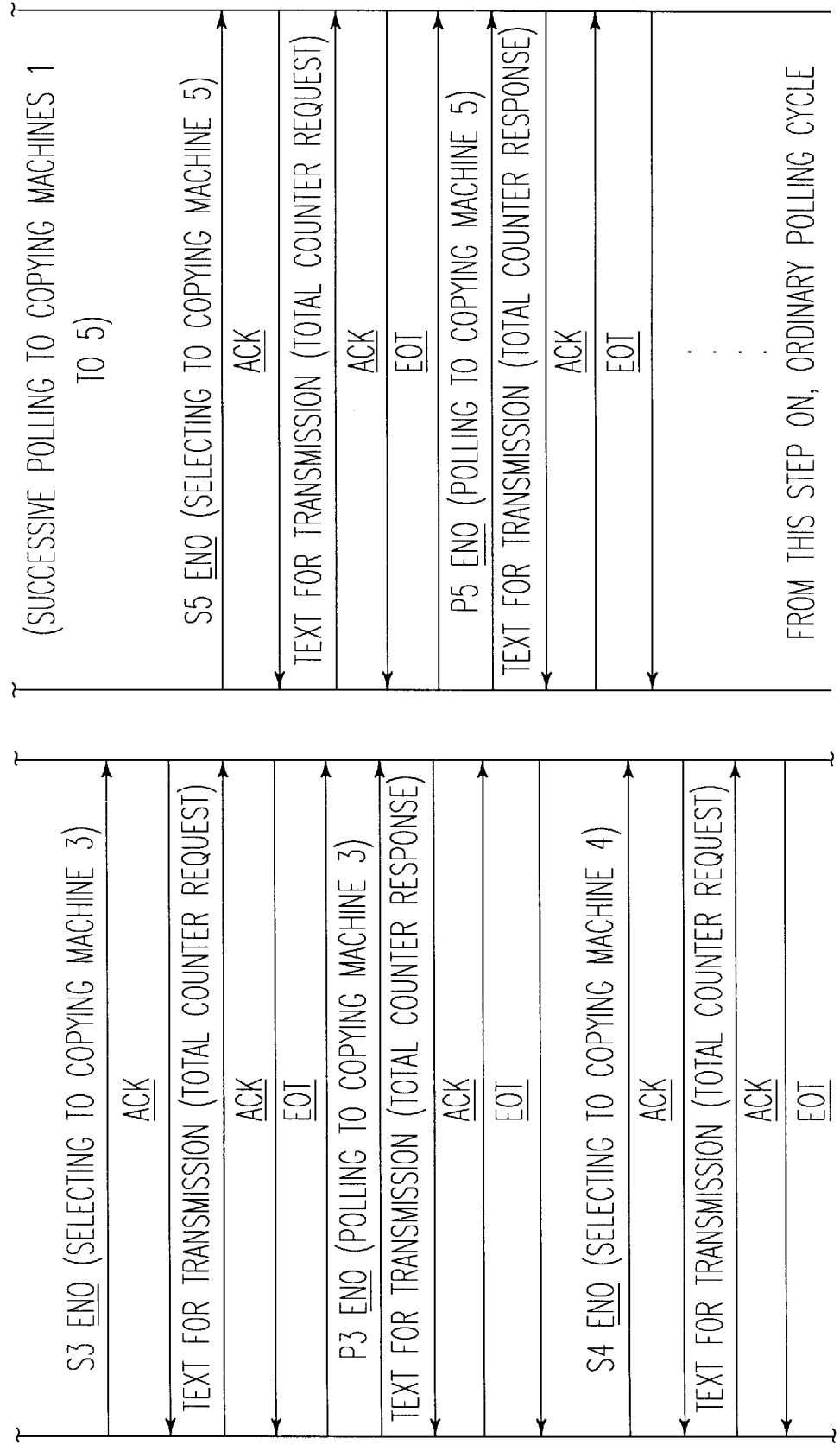

ACCESS FROM COPYING MACHINE TO COMMUNICATION CONTROL UNIT ( DATA FORMAT )

IMAGE FORMING APPARATUS ADMINISTRATION SYSTEM INCLUDING A COMMUNICATION CONTROL UNIT AND AN ADMINISTRATING DEVICE

FIELD OF THE INVENTION

The present invention relates to an image forming apparatus administration system in which a plurality of image forming apparatuses such as copying machines and an administrating device are connected through a communication control unit and a public line network so that various types of image forming apparatus can be put under centralized management by the administrating device.

DISCUSSION OF THE BACKGROUND

As an example of this type of image forming apparatus administration system, as disclosed in, for instance, Japanese Patent Laid-Open Publication No. 257155/1990, Japanese Patent Laid-Open Publication No. 259666/1990, and Japanese Patent Laid-Open Publication No. 196053/1991, there has been known a system in which an image forming apparatus such as a copying machine can be connected to an administrating device installed in a service center by utilizing a communication line such as a public line or the like.

This type of image forming apparatus administration system collects data as to how each of image forming apparatuses are used, and utilizes the data for controlling the apparatuses for maintenance of the image forming apparatus under centralized management of a plurality of image forming apparatuses each provided in a remote place by the administrating device (host machine) installed at one site. Contents on the data as to how the apparatuses are used include a number of copied sheets of paper, while contents of the maintenance include automatic call out to the administrating device according to self-diagnosis by the image forming apparatus and adjustment of each section of the image forming apparatus executed in response to access from the administrating device thereto.

Also, by making use of this system, a counter value (generally a number of copied sheets of paper) for charging the contracted maintenance fee for any image forming apparatus (copying machine), which is, conventionally, checked by a serviceman (service engineer) who visits customer sites or by a call, is read out.

Further, the serviceman makes a report to a service center from the customer sites when a maintenance work for the image forming apparatus is to be started, and also when the work is finished.

However, when the serviceman is to make a contact with a service center, when the serviceman starts a maintenance work and also when he finishes the work, at a customer site to inform the facts described above, the contact can not always be carried out smoothly because there are some inconvenient cases where a telephone unit at the costumer site can not be used, so that the serviceman has to go out for using a public telephone set, or even if the telephone set can be used, a supervisor in the service center does not happen to be at the site.

For this reason, the present invention was made in the light of the circumstances as described above, and it is an object of the present invention to provide an image forming apparatus administration system in which a serviceman at a costumer site can smoothly make a contact with a service center at any time before a maintenance work for the image forming apparatus is started and after the work is ended.

SUMMARY OF THE INVENTION

The present invention is characterized in that a plurality of image forming apparatuses and an administrating device are connected through a communication control unit and a public line network, and that the image forming apparatus administration system in which each of the image forming apparatuses can be put under centralized management by the administrating device comprises each of the following means to achieve the object described above.

In the present invention, as shown in a functional block diagram in FIG. 1, the image forming apparatus comprises a work start instructing means A for instructing start of a maintenance work; a work start data transmitting means B for transmitting data for start of the work to the administrating device when an instruction for start of a maintenance work is issued from the work start instructing means; a work end instructing means C for instructing end of the maintenance work; and a work end data transmitting means D for transmitting data for end of the maintenance work to the administrating device when an instruction for end of the maintenance work is issued from the work end instructing means.

In the present invention, there is provided in the image forming apparatus also a time measuring means E for measuring time; and a work end data automatically transmitting means F for having the time measuring means E start time measurement when an instruction for start of a maintenance work is issued by the work start instructing means A and automatically transmitting work end data to the administrating device in a case where an instruction for end of the maintenance work is not issued from the work end instructing means C even when the measurement time reaches a prespecified period of time.

In the present invention, the work end data transmitting means D and the work end data automatically transmitting means F transmit work end data having different contents respectively.

In the present invention, there is provided a means for setting a period of time from a point of time when an instruction for start of a maintenance work from the work start instruction means A until a point of time when work end data is automatically transmitted by the work end data automatically transmitting means F, to any given value.

In the present invention, there is provided in the image forming apparatus also a means for backing up the time measuring means E.

In the present invention, there is provided in the image forming apparatus also a means for inhibiting reception of an instruction for start of a next maintenance work after an instruction for start of a maintenance work is once received from the work start instructing means A until a point of time when an instruction for end of the maintenance work is issued from the work end instructing means C.

In the present invention, there is provided in the image forming apparatus also a means for inhibiting reception of an instruction for start of a next maintenance work after an instruction for start of a maintenance work is once received from the work start instructing means A until a point of time when an instruction for end of the maintenance work is issued from the work end instructing means C, or until a period of time measured by the time measuring means E reaches a prespecified period of time.

In the present invention, there is provided in the image forming apparatus also a means for inhibiting transmission of data indicating abnormality to the communication control unit in a case where any abnormality is generated during a time from a point of time when an instruction for start of a maintenance work is issued from the work start instructing means A until a point of time when an instruction for end of the maintenance work is issued from the work end instructing means C.

In the present invention, there is provided in the image forming apparatus in the image forming apparatus administration system according to claim 8, a means for transmitting, when transmission of particular data excluding the data indicating abnormality described above is requested from a point of time when an instruction for start of a maintenance work is issued from the work start instructing means A until a point of time when an instruction for end of the maintenance work is issued from the work end instructing means C, the particular data to the administrating device.

In the present invention, there is provided in the image forming apparatus also a means for inhibiting transmission of data indicating abnormality to the communication control unit in a case where any abnormality is generated during a time from a point of time when an instruction for start of a maintenance work is issued from the work start instructing means A until a point of time when an instruction for end of the maintenance work is issued from the work end instructing means C, or until a period of time measured by the time measuring means E reaches a prespecified period of time.

In the present invention, there is provided in the image forming apparatus also a means for transmitting, when transmission of particular data excluding the data indicating abnormality described above is requested during a time from a point of time when an instruction for start of a maintenance work is issued from the work start instructing means A until a point of time when an instruction for end of the maintenance work is issued from the work end instructing means C, or until a period of time measured by the time measuring means E reaches a prespecified period of time, the particular data to the administrating device.

Namely, in the image forming apparatus administration system according to the present invention, the image forming apparatus transmits, when an instruction for start of a maintenance work is issued from the work start instructing means A shown in FIG. 1, work start data to the administrating device (service center) with the work start data transmitting means B, and transmits, when an instruction for end of the maintenance work is issued from the work end instructing means C, work end data to the administrating device with the work end data transmitting means D, so that a serviceman at costumer site can immediately make a contact with the service center before a maintenance work for an image forming apparatus is started and after the work is ended without using a telephone set at the customer site or a public telephone set outside the sites.

It should be noted that, in a case where time measurement is started by the time measuring means E when an instruction for start of a maintenance work is issued from the work start instructing means A, and an instruction for end of the maintenance work is not issued from the work end instructing means C even when the measured period of time reaches a prespecified period of time, work end data is automatically transmitted to the administrating device by the work end data automatically transmitting means F, so that even in a case where the serviceman forgets to make a contact with the service center from customer site to inform that the maintenance work for the image forming apparatus is ended, any inconvenience in relation to management for the apparatuses is not generated in the side of service center.

The work end data transmitting means D and the work end data automatically transmitting means F transmit work end data having different contents respectively, so that the service center can easily determine whether the serviceman has been reported thereto that the maintenance work has been ended or not, namely whether the serviceman has forgotten its duty to make a report or not.

Further, it is quite convenient for the serviceman that a period of time, from a point of time when an instruction for start of a maintenance work from the work start instruction means A until a point of time when work end data is automatically transmitted by the work end data automatically transmitting means F, can be set to any given value. Namely, a period of time required for the work can be varied according to a skill or some other conditions which each servicemen has, so that the prespecified period of time described above can be set to the most suited value to the serviceman.

If the time measuring means E is supported by a back-up system, work end data can automatically be transmitted to the administrating device by the work end data automatically transmitting means F after the prespecified period of time has passed, even if a power is disconnected during the measuring time.

Reception of an instruction for start of a next maintenance work is inhibited after an instruction for start of a maintenance work is once received from the work start instructing means A until a point of time when an instruction for end of the maintenance work is issued from the work end instructing means C or until a period of time measured by the time measuring means E reaches a prespecified period of time, so that even in a case where an instruction for start of a maintenance work is issued again (due to a case where the serviceman accidentally touches a key for start of a maintenance work or similar cases) while the maintenance work is executed according to the initial instruction for start of the maintenance work, work start data (unnecessary data) is not transmitted to the administrating device.

Further, transmission of data indicating abnormality to the communication control means is inhibited in a case where any abnormality is generated during a time from a point of time when an instruction for start of a maintenance work is issued from the work start instructing means A until a point of time when an instruction for end of the maintenance work is issued from the work end instructing means C or until a period of time measured by the time measuring means E reaches a prespecified period of time, so that it can be avoided that a supervisor in the service center arranges other serviceman to be sent because data indicating abnormality generated by mistake, while the serviceman is checking his operations or something else, has been transmitted to the administrating device.

Further, in a case where transmission of particular data (e.g. data indicating shortage of a supply of toner or papers for copying) excluding the data indicating abnormality described above is requested during a time from a point of time when an instruction for start of a maintenance work is issued from the work start instructing means A until a point of time when an instruction for end of the maintenance work is issued from the work end instructing means C or until a period of time measured by the time measuring means E reaches a prespecified period of time, the particular data is transmitted to the administrating device, so that any inconveniences in relation to management for the apparatus, such as that a user can not immediately use the image forming apparatus because of running out of toner therein or some other reasons after the serviceman has completed the maintenance work, can be avoided as much as possible.

As described above, with the image forming apparatus administration system according to the present invention, the image forming apparatus transmits data for start of a maintenance work or data for end of the maintenance work to the administrating device (service center) by the console panel when an instruction for start of a maintenance work or that for end of the maintenance work is issued, so that a serviceman can smoothly make a report from any customer site to the service center at any time before a maintenance work for the image forming apparatus is started and after the work is ended.

With the image forming apparatus administration system according to the present invention, in a case where time measurement is started when an instruction for start of a maintenance work is issued, and an instruction for end of the work is not issued even when the period of time reaches the prespecified period of time, data for end of the maintenance work is automatically transmitted to the administrating device, so that even in a case where the serviceman forgets to report that the maintenance work for the image forming apparatus is ended from customer site to the service center, any inconvenience in relation to management for the apparatus is not generated in the side of service center.

With the image forming apparatus administration system according to the present invention, contents of data for the work end transmitted when an instruction for end of the maintenance work is issued and that of data for the work end transmitted when the prespecified period of time has passed are different from each other, so that the service center can easily determine whether or not the serviceman has forgotten to report an end of the maintenance work to the service center.

With the image forming apparatus administration system according to the present invention, the prespecified period of time described above can be set to the most suited value to skill or some other conditions which each of the servicemen has.

With the image forming apparatus administration system according to the present invention, data for work end can automatically transmitted to the administrating device after the prespecified period of time has passed even if a power is disconnected during the time measurement.

With the image forming apparatus administration system according to the present invention, reception of an instruction for start of a next maintenance work is inhibited after an instruction for start of a maintenance work is once received until a point of time when an instruction for end of the maintenance work is issued or until the measured period of time reaches the prespecified period of time, so that even in a case where an instruction for start of a maintenance work is issued again while the maintenance work is executed according to the initial instruction for start of the maintenance work, data for start of a work (unnecessary data) is not transmitted to the administrating device.

With the image forming apparatus administration system according to the present invention, transmission of data indicating abnormality to the communication control unit is inhibited in a case where any abnormality is generated during a time from a point of time when an instruction for start of a maintenance work is issued until a point of time when an instruction for end of the maintenance work is issued or until the measured period of time reaches the prespecified period of time, so that it can also be avoided that a supervisor in the service center arranges other serviceman to be sent because data indicating abnormality generated by mistake, while the serviceman is checking his operations or something else, has been transmitted to the administrating device.

With the image forming apparatus administration system according to the present invention, in a case where transmission of particular data for which the service center will not arrange a serviceman to be sent) excluding the data indicating abnormality described above is requested during a time from a point of time when an instruction for start of a maintenance work is issued until a point of time when an instruction for end of the maintenance work is issued or until the measured period of time reaches the prespecified period of time, the particular data is transmitted to the administrating device, so that there is much smaller possibility that any inconvenience in relation to management for the apparatus, such as a user can not immediately use the image forming apparatus after the serviceman has completed the maintenance work, is generated.

BRIEF DESCRIPTION OF THE DRAWINGS

FIGS. 9(a), 9(b) and 9(c) is a communication sequence view when the remote reporting is executed in the image forming apparatus administration system in this embodiment;

FIGS. 10(a), 10(b) and 10(c) is a communication sequence view in a case where the administrating device also accesses a copying machine;

FIGS. 11(a), 11(b) and 11(c) is a communication sequence view in a case where the administrating device also accesses the communication control unit;

FIG. 13 is a listing view of parameters set in the communication control unit 18 shown in FIG. 6;

FIGS. 14(a), 14(b) and 14(c) is an explanatory view showing an example of a format for communication data used when remote reporting is executed;

FIG. 15 is a view showing an example of a data format when a Read processing is executed for access from the administrating device to a copying machine shown in FIG. 5;

FIG. 17 is a view showing an example of a data format when an Execute processing is performed;

FIGS. 18(a), 18(b) and 18(c) is a view showing an example of a data format when the administrating device accesses the communication control unit;

FIG. 19 is a view showing an example of a data format when the communication control unit accesses a copying machine;

FIG. 20 is a flow chart showing a reporting control executed when a power is turned ON by a CPU in the copying machine;

DESCRIPTION OF THE PREFERRED EMBODIMENTS

Detailed description is made for the present invention with reference to the related drawings.

Figure 2:
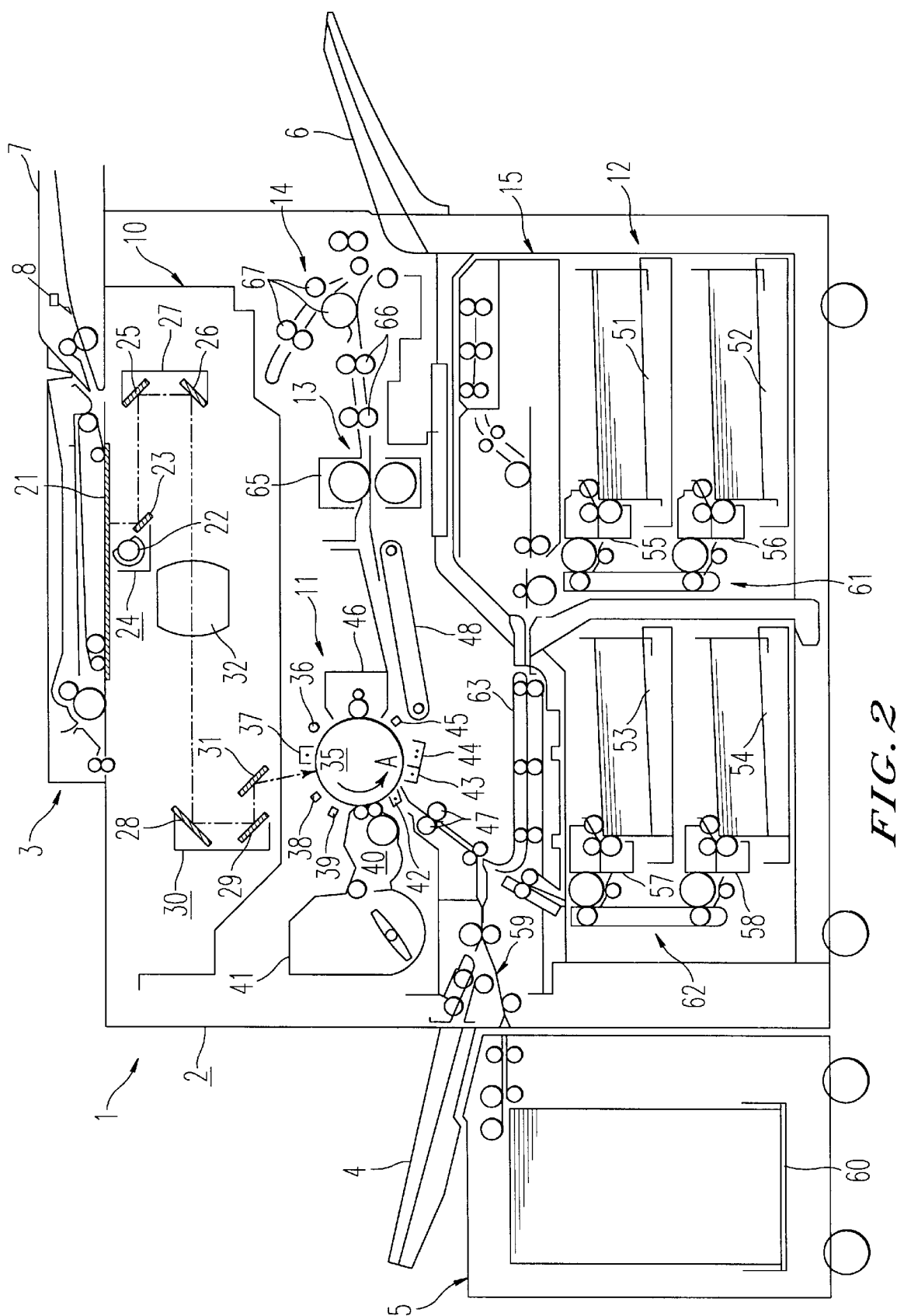
FIG. 2 is a general block diagram showing a copying machine as an example of the image forming apparatus used in the embodiment.

At first, description is made for a general configuration of a copying machine used in this embodiment as an example of the image forming apparatus constituting the image forming apparatus administration system according to the present invention with reference to FIG. 2.

This copying machine 1 is a plain paper copier (PPC) based on an electrophotographic system, in which an auto document feeder 3 (abbreviated as "ADF" hereinafter) is placed on the main body 2 of the copying machine, a tray 4 for manually feeding paper and a large capacity paper feeding device 5 are attached to one side of the copying machine, and a paper discharging tray 6 is attached to the other side thereof respectively. The reference numeral 7 indicates a document tray for the ADF 3 which has a sensor for a set a documents 8.

A scanner section 10, an image forming section 11, a paper feeding section 12, a fixing and paper discharging section 13, a reversing section 14, and a double-sided unit 15 are provided in the main body 2 of the copying machine.

The scanner section 10 comprises a first scanner 24 comprising a contact glass 21, an exposure lamp 22 and a first mirror 23; a second scanner 27 comprising a second mirror 25 and a third mirror 26; a third scanner 30 comprising a fourth mirror 28 and a fifth mirror 29; a sixth mirror 31; and a lens 32.

Arranged around a photosensitive drum 35 in the image forming section 11 are a quenching lamp 36, an electrifying charger 37, an eraser 38, a potential sensor 39, a developing unit 40 attaching thereto a toner cartridge 41, a pre-transferring charger 42, a transferring charger 43, a separating charger 44, a P sensor 45, and a cleaning unit 46. Also, a pair of resist rollers 47 are provided in front of a position for transcription in a transfer paper carrier-path, and a carrier belt 48 is provided behind the position for transcription.

Detachably provided in the paper feeding section 12 are a first tray 51, a second tray 52, a third tray 53, and a fourth tray 54 each as a tray for stocking transfer paper therein as well as feeding therefrom transfer paper. As a paper feeding unit for feeding transfer paper stocked therein, a first paper feeding unit 55, a second paper feeding unit 56, a third paper feeding unit 57, and a fourth paper feeding unit 58 are provided each in the paper feeding section 12, and a manually-feeding/large capacity paper feeding unit 59 for feeding transfer paper from the tray 4 for manually feeding paper or from a large capacity tray (LCT) 60 in the large capacity paper feeding device 5 is also provided therein.

Further, a right carrier section 61, a left carrier section 62, and a horizontal carrier section 63 are provided each in the paper feeding section 12 to carry transfer paper fed by each of the paper feeding units 55 to 59 as well as by the double-sided unit 15 to the pair of resist rollers 47.

A fixing unit 65 and a group of carrier-rollers 66 for discharging paper are also provided in the fixing and paper discharging section 13, and a group of reversing rollers 67 are provided in the reversing section 14 respectively.

Next, a brief description is made for operations of the copying machine 1 having the configuration described above.

The photosensitive drum 35 is rotatably supported by a drum shaft (not shown herein), and rotates in the direction shown by the arrow A according to an instruction for copying.

A document fed on to the contact glass 21 by the ADF 3 is scanned and exposed by the first scanner 24. An image by the light reflected thereon is formed on the photosensitive drum 35 through the first mirror 23, second mirror 25, third mirror 26, lens 32, fourth mirror 28, fifth mirror 29, and sixth mirror 31.

The surface of the photosensitive drum 35 is charged by the electrifying charger 37, and the charged surface thereof is exposed to the reflected light image to form an electrostatic latent image thereon. Then, the formed latent image is corrected to a latent image suited to transfer paper or an projected image by casting a light to any unnecessary portions with the eraser 38. In this step, to obtain an image in the original size, the photosensitive drum 35 and the first scanner are driven each at the same speed. And the latent image on the photosensitive drum 35 is realized as a toner image by the developing unit 40. In this process, it is possible to obtain a dark or light image through the application of a potential (developing bias voltage) to the developing unit 40.

On the other hand, the transfer paper stocked in any of the first tray 51, second tray 52, third tray 53, fourth tray 54, manually feeding tray 4, large capacity tray 60, or double-sided unit 15 is selected by any of the paper feeding units 55 to 59, and is fed at a prespecified feeding timing, and the fed transfer paper is carried to the pair of resist rollers 47 previously stopped through the right carrier section 61, left carrier section 62, and horizontal carrier section 63. Then the pair of resist rollers 47 are driven at a timing in which a tip of the toner image on the photosensitive drum 35 meets a tip of the transfer paper.

With this process, the toner image on the photosensitive drum 35 is transferred onto the transfer paper by effects of the pre-transferring charger and transferring charger 43. In this step, the surface of the photosensitive drum 35 is very smooth and the adhering strength of the transfer paper to the surface is large, so that the potential of the transfer paper is lowered by effects of the separating charger 44, which makes the adhering strength lower.

Then, the transfer paper is separated from the photosensitive drum 35 by a separation claw which is not shown herein, the separated transfer paper is sent to the fixing unit 65 by the carrier belt 48. For the transfer paper sent to the fixing unit 37, heat and pressure are added to the toner herein, whereby the toner image on the transfer paper is fused to the transfer paper, and then the paper is discharged onto the paper discharging tray outside the machine by the group of carrier rollers 66 for paper discharging. When double-sided copying is to be executed, the copied paper is once sent into the reversing section 14, a carrier direction is reversed to send to the double-sided unit 15, and the reversed paper is fed again to the image forming section 11 when an image on the next document is to be copied.

Some toner which could not be transferred is left on the surface of the photosensitive drum 35 after the transcription has been executed, so that the surface thereof is cleaned with a brush and cleaning blade in the cleaning unit 46, and then nonuniform potential on the surface is made to a constant level by the quenching lamp 36.

These controlling timings are controlled by a control circuit described later mainly according to a pulse generated by synchronizing to the rotation of the photosensitive drum 35 or to a reference pulse for driving the photosensitive drum 35.

Figure 3:
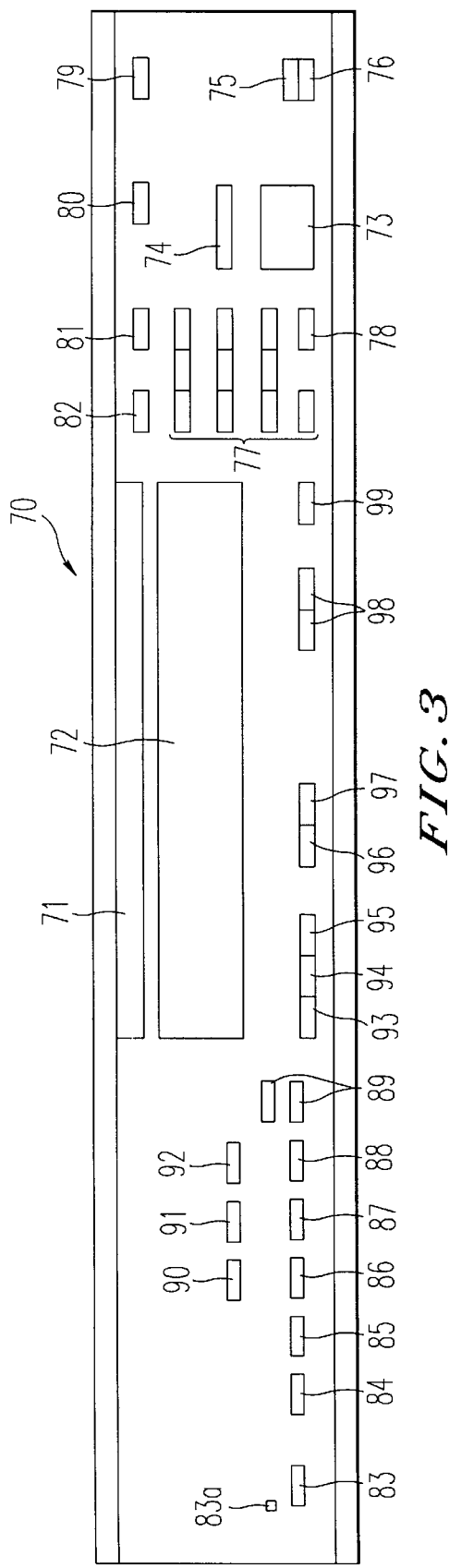
FIG. 3 is a lay-out view showing an example of an operating section in the copying machine shown in FIG. 2.

FIG. 3 shows an example of the operating section of this copying machine.

Provided in the center section of the operating section 70 are a guidance display section 71 and a pattern display section 72 each using a liquid crystal display panel, and various types of keys are provided in the both sides of as well as in front of the display sections.

Provided in the right side thereof is a start key 73, an interrupt key 74, a pre-heating key 75, a mode clear/pre-heating key 76, a ten-key 77, a clear/stop key 78, a timer key 79, a program key 80, an enter key 81, and a guidance key 82.

Provided in the left side thereof is a remote reporting key 83, a sorter key 84, a double-sided key 85, a key for continuously transferring pages 86, delete key 87, a paper specified size changing key 88, a zoom key 89, a binding margin adjusting key 90, a centering key 91, and a dimension changing key 92.

Provided in front to the center section thereof is a size reducing key 93, a size enlarging key 94, an original size key 95, a paper selecting key 96, a paper automatically selecting key 97, a density adjusting key 98, and a density automatically adjusting key 99.

It should be noted that an LED for a remote reporting display 83a is lit while the remote reporting key 83 is ON and remote reporting is executed.

Figure 4:
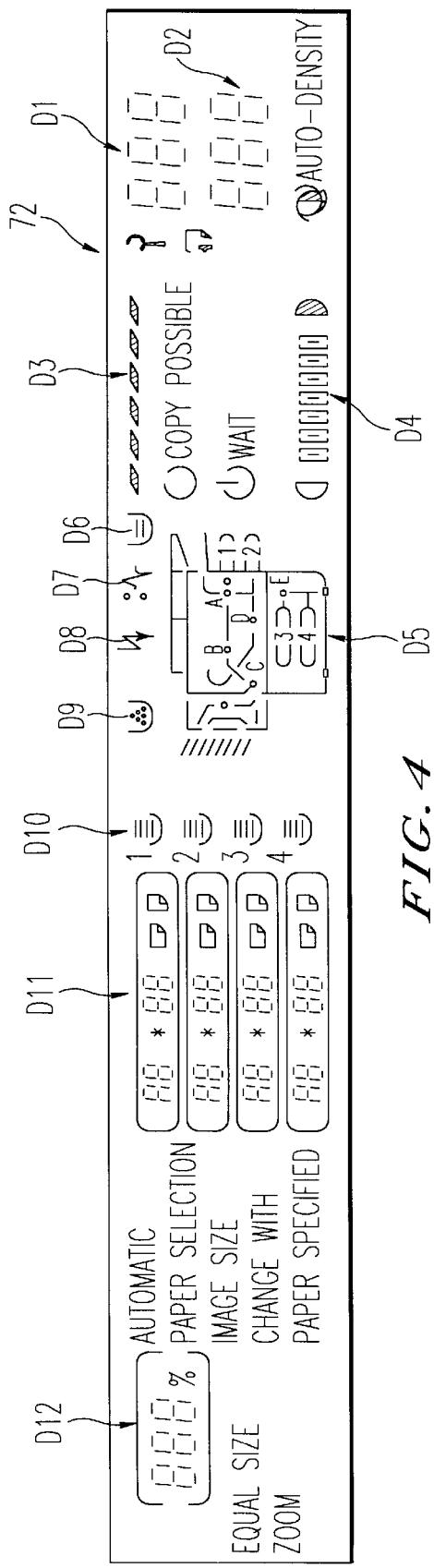
FIG. 4 is a view showing an example of an original screen displayed on a pattern display section 72 of the operating section shown in FIG. 3.

FIG. 4 is an enlarged view of a default screen displayed on the pattern display section 72, and a display D1 for a number of set sheets of paper, a display D2 for a number of sheets to be copied, a display D3 for indicating a copy operation is running, a density adjustment display D4, a misfeed position display D5, a paper supply display D6, a misfeed display D7, a display D8 for remote communication abnormality, a toner supply display D9, a paper remaining display D10, a paper select/size/direction display D11, and a size magnification display D12 are displayed each as a pattern respectively.

The guidance display section 71 shown in FIG. 3 displays a message for the operations and alarms. Also the operating section 70 is characterized in that a remote reporting key 83 for a user to send a request for service to the service site (service center) and a remote communication abnormality display D8 displayed in a case where an abnormality is generated in the report is provided therein. However, without providing the dedicated remote reporting key like in this example, a function corresponding to the remote reporting key may be realized according to a sequence of pressing other keys or to a timing for pressing, or as well as to combination of pressing keys.

Figure 5:
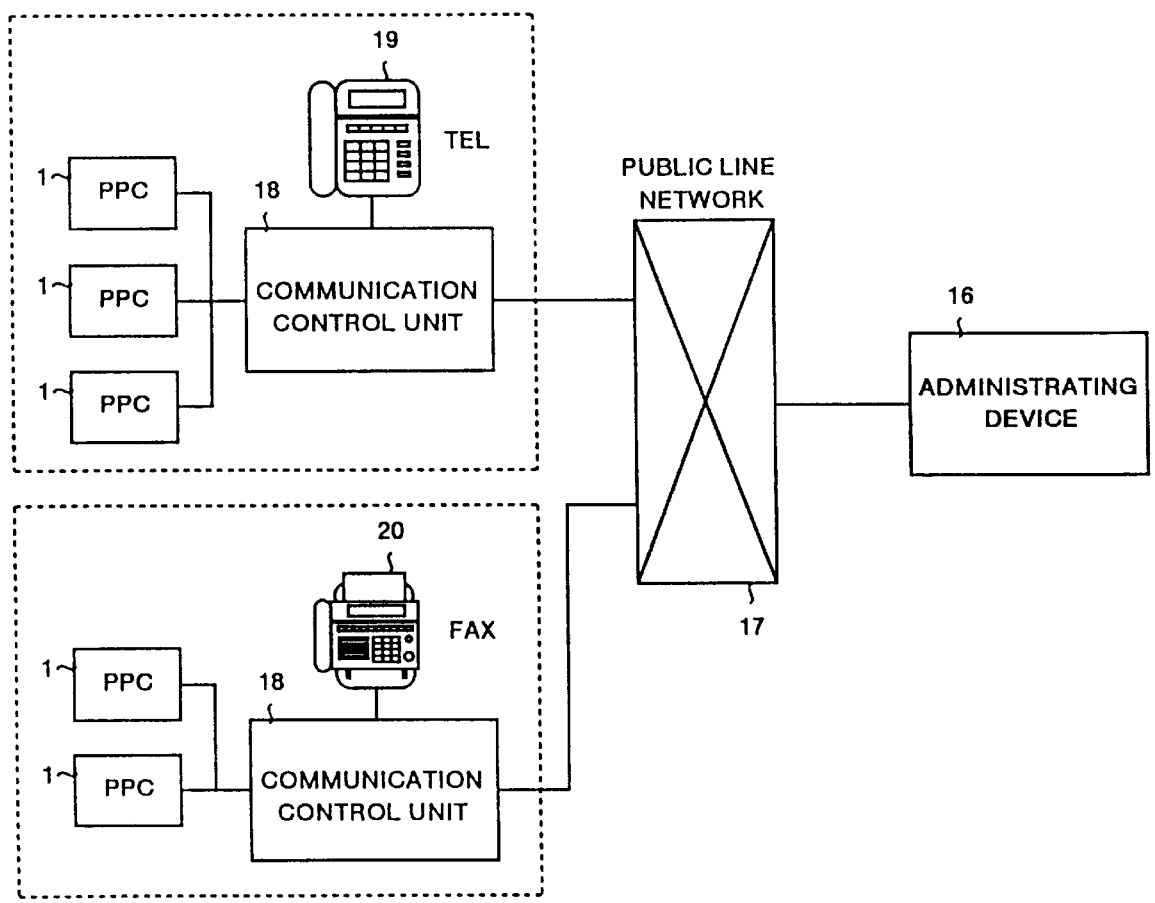
FIG. 5 is a block diagram showing a configuration example of the image forming apparatus administration system according to the present invention.

FIG. 5 shows a configuration example of the image forming apparatus administration system according to the present invention.

An administrating device 16 provided in a service site and the image forming apparatus such as a copying machine 1

(described "PPC" in the figure) provided in each user's site are connected through a public line network 17 which is a communication line. It should be noted that the administrating device 16 is provided in each of the service sites, so that a host machine, which is not shown herein, for globally controlling these devices is also connected thereto.

A communication control unit 18 for controlling a communication with the administrating device 16 is provided in each user's site, and each of the copying machines 1 provided in each user's site is connected to this communication control unit 18. External communicating machines such as a telephone set 19 or a facsimile device 20 can be connected to the communication control unit 18 through a connecting means which is not shown herein, and any of the external machines can be installed by inserting its line to already-existing lines in the user's site.

Also, a plurality of copying machines 1 can be connected to the communication control unit, and it is needless to say that a single machine connected thereto may be only one. The types of these copying machines 1 are not required to be identical, and may be different from each other, or any image forming apparatus such as a printer other than a copying machine may be used. To make the description more simply, it is assumed herein that up to 5 units of copying machines 1 can be connected to one unit of communication control unit 18. The communication control unit 18 and a plurality of copying machines 1 are connected in a multi-drop form according to the RS-485 standard.

Communication control between the communication control unit 18 and each of copying machines 1 is executed according to a controlling procedure for basic type data transfer. Communication with any of copying machines can be established by establishing a data link in a polling/ selecting system for a centralized control in which a communication control unit 18 functions as a control station. Each of copying machines can set a particular value by an address setting switch, whereby a polling address and a selecting address for each of copying machines are decided.

Figure 6:
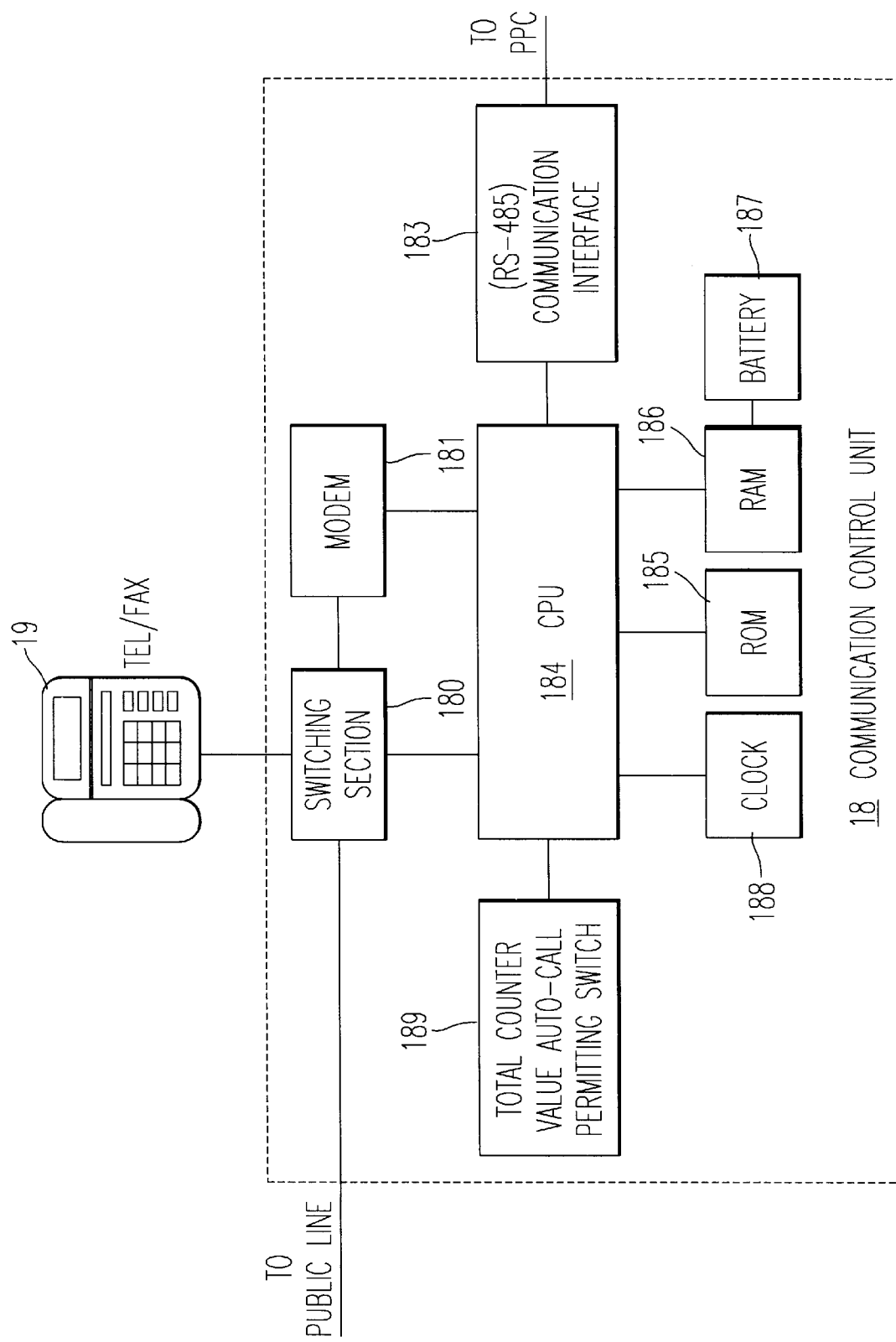
FIG. 6 is a block diagram showing a configuration example of a communication control unit 18 shown in FIG. 5.

FIG. 6 is a block diagram showing an example of configuration of the communication control unit 18 shown in FIG. 5. A signal from a public line network 17 is, at first, received by a switching section 180. If the signal from a public line is addressed to a telephone set 19 (or to a facsimile device 20 in FIG. 5) connected to the communication control unit 18, the public line side is connected to the telephone set 19 (or to a facsimile device 20 in FIG. 5), and if the signal is received from the administrating device 16, line is connected to a modem 181 in the public line.

Communication with any of copying machines 1 is executed through a communication interface 183 using a transceiver for the RS-485. These controls and processing are executed mainly by a CPU 184 according to a control program in a ROM 185. A intermediate result of the processing is stored in a RAM 186, and in addition the RAM is used for temporarily storing a communication text therein. Also, various types of parameter required for operations of the communication control unit 18 from the administrating device 16 are also written in the RAM 186.

Generally, this communication control unit 18 is always in a state where communication with the administrating device 16 can be established by being continuously charged for 24 hours, but a RAM 186 is backed-up by a battery 187 so that there will be no possibility that contents of these parameters and a communication text will be lost in accidental disconnection of a power. Further, a clock 188 and a switch 189 for permitting a total counter value automatic calling are provided therein.

Figure 7:
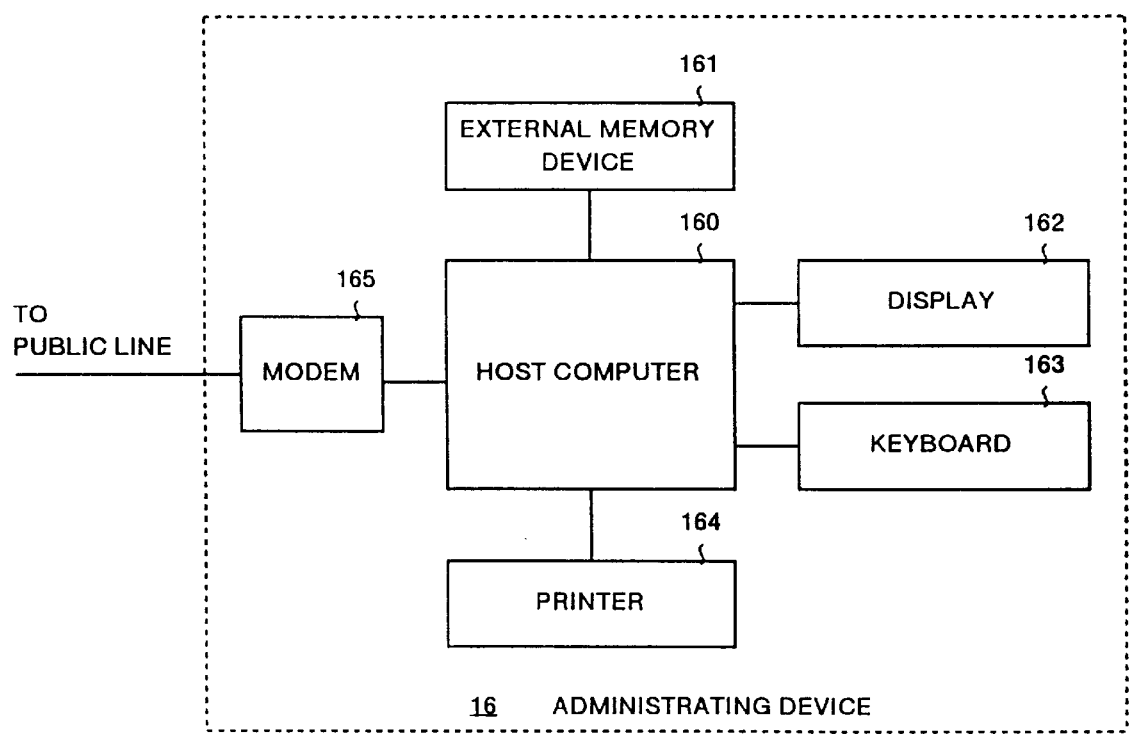
FIG. 7 is a block diagram showing a configuration example of the administrating device 16 shown in FIG. 5.

FIG. 7 is a block diagram showing an example of configuration of the administrating device 16 shown in FIG. 5.

This administrating device 16 comprises a host computer 160 for executing various types of processing, an external storage device 161 such as a magnetic disk for storing controlling data, a display 162 for displaying, a key board 163 as an operating means, a printer 164 for outputting controlling data, and a modem 165 for connecting to a public line network 17.

Also the administrating device 16 is connected to the host machine through a local area network LAN which is not shown herein. This host machine is a computer for providing integrated controls over a plurality of administrating devices 16, and performs various types of daily work other than data control for the image forming apparatus administration system. The construction of the system is the same as that in a well known mainframe computer.

Figure 8A:
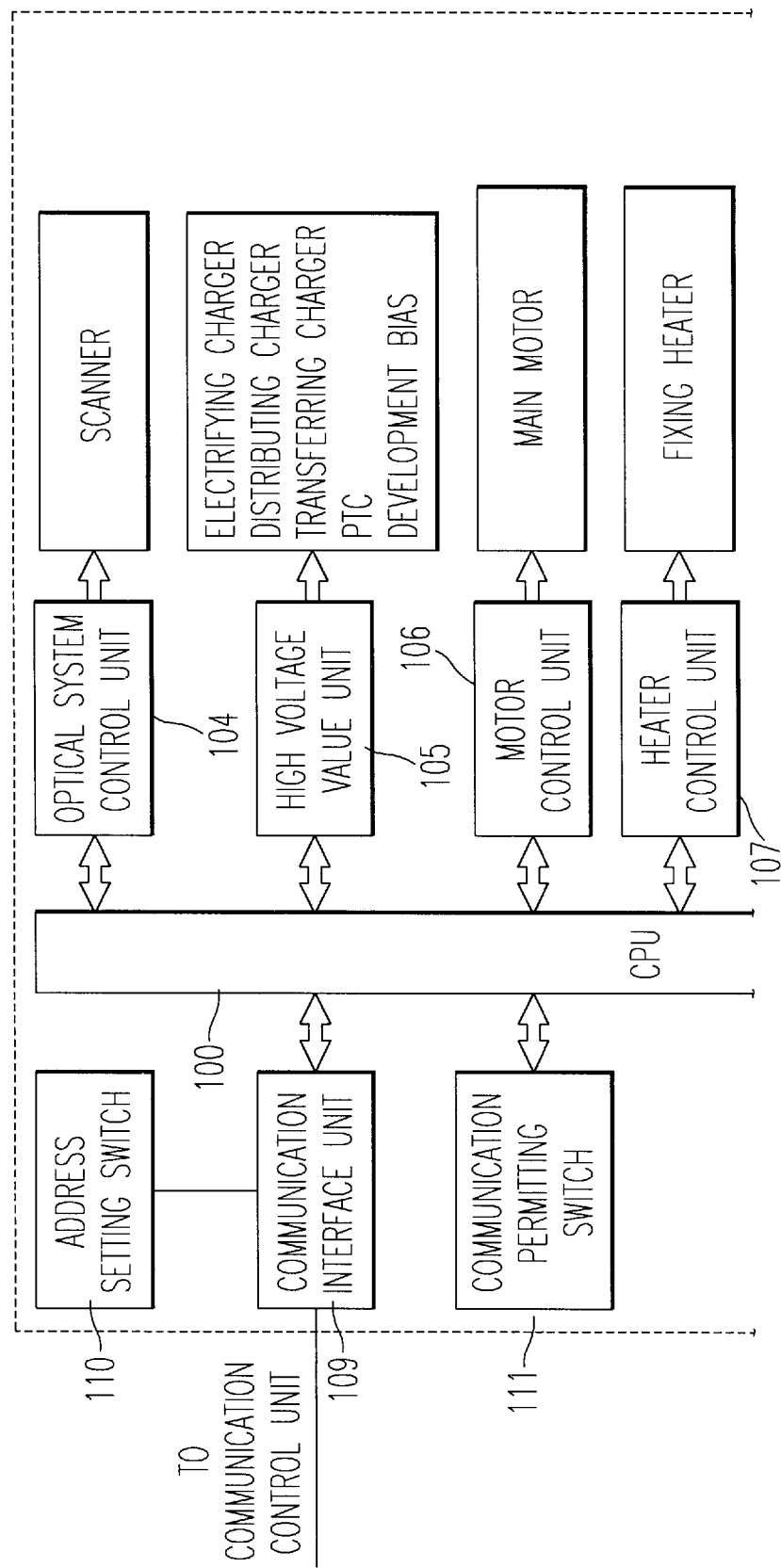
FIG. 8 is a block diagram showing a configuration example of the control system in the copying machine 1 shown in FIG. 2 and FIG. 5.
Figure 8B:
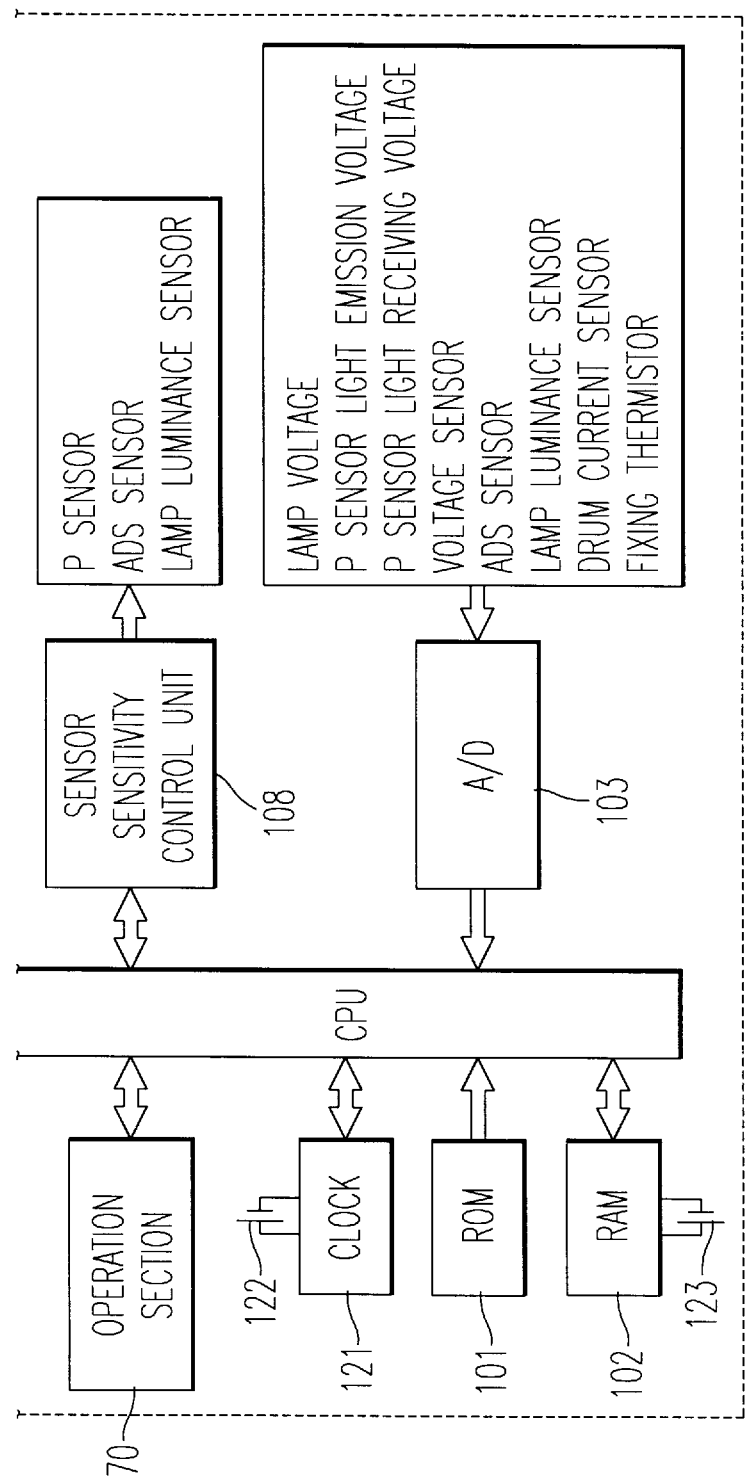

FIG. 8 is a block diagram showing configuration of a control system in a copying machine 1 shown in FIG. 2.

Control to the main body 2 of a copying machine 2 is provided mainly by the CPU 100 according to a control program stored in the ROM 101 as well as to time data from the clock 121 or the like. Also the RAM 102 is used for storing data for an intermediate result of the processing or various types of setting values, and a state of any apparatus. It should be noted that the clock 121 and RAM 102 are backed up by batteries 122 and 123 respectively.

An A/D converter 103 is used for a supply voltage to the exposure lamp 22, a light emission voltage and a light receiving voltage for the P sensor 45, an output from the potential sensor 39, an output from the ADS sensor, an output from the lamp light amount sensor for detecting a quantity of light from the exposure lamp 22, an output from the drum current sensor for detecting a current flowing through the photosensitive drum 35, and an input of a voltage for a thermistor in the fixing unit 65.

An optical system control unit 104 controls the scanner section 10 shown in FIG. 2.

A high-pressure power unit 105 supplies a high voltage applied to the electrifying charger 37, separating charger 44, transferring charger 43, and pre-transferring charger (PTC) 42 respectively, and also supplies development bias voltage applied to the developing roller in the developing unit 40.

A motor control unit 106 provides a control to a main motor for driving the photosensitive drum 35 and rollers in each of the paper feeding units as well as in the carrier section.

A heater control unit 107 controls supply of electricity to a fixing heater for heating up the fixing roller in the fixing unit 65, and keeps a temperature on the surface of the fixing roller within a prespecified range.

A sensor sensitivity control unit 108 is used for varying a gain of the light received by the sensor for a quantity of light from the lamp, a gain of the light received by the ADS sensor, a gain of the light received by the P sensor, and an emission voltage for the LED in the P sensor or the like.

A communication interface unit 109 is one for communicating with the communication control unit 18. Address specific to each copying machine can be set in a range from 1 to 5 with an address setting switch 110. Also, Permission/ inhibition of communication with the communication control unit 18 can be set by a communication permitting switch 111.

This communication permitting switch 111 is a dip switch which is turned ON by a serviceman when a copying machine mounting the dip switch thereon is connected to the image forming apparatus administration system (remote testing system), so that a user normally can not touch the switch as a rule. Accordingly, the communication permitting switch 111 is kept ON while any copying machine mounting it thereon is connected to the image forming apparatus administration system.

Figure 1:
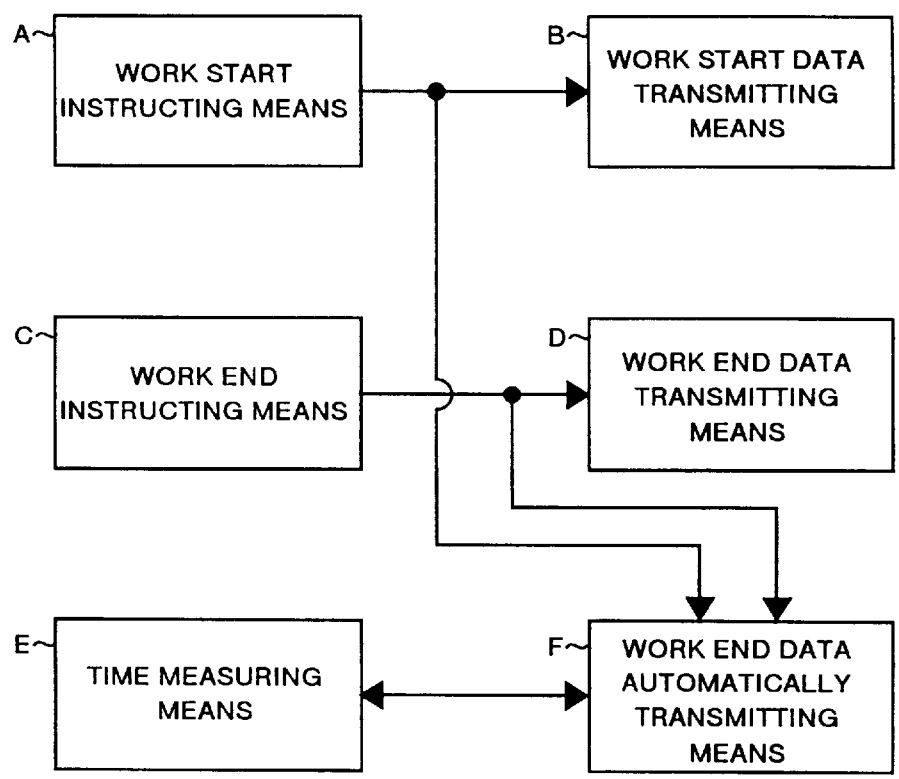
FIG. 1 is a functional block diagram showing basic configuration of the present invention.

It should be noted that the CPU 100, ROM 101, RAM 102, clock 121, batteries 122, 123, and communication interface unit 109 play functions as the work start instructing means A, work start data transmitting means B, work end instructing means C, work end data transmitting means D, time measuring means E, and work end data automatically transmitting means F shown in FIG. 1 each as described above.

Figure 9A:
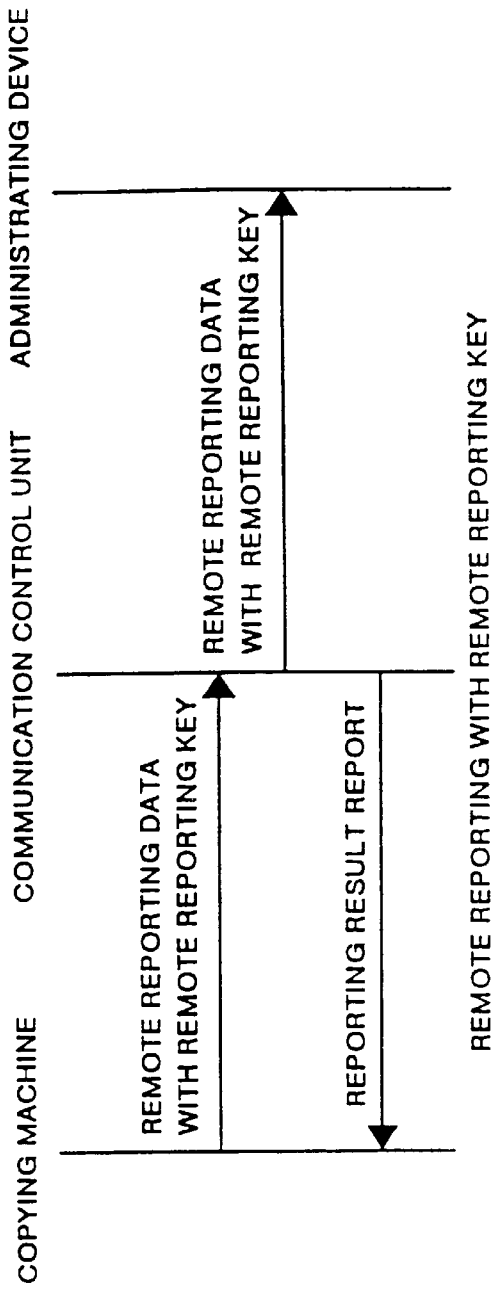
Figure 9B:
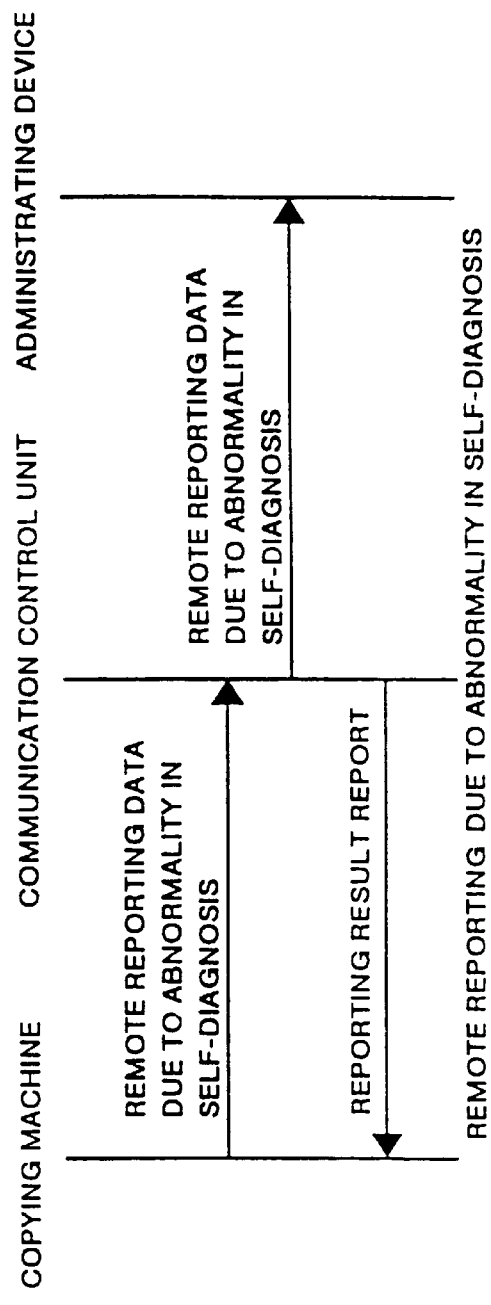

Next, a detailed description is made for effects in the embodiment mainly with reference to FIG. 9 and the subsequent drawings. At first, description is made for a function of remote reporting with reference to FIG. 9 and FIG. 5.

In a case of remote reporting by the remote reporting key, when the remote reporting key 83 provided in the operating section 70 in a copying machine 1 is pressed, as shown in FIG. 9(*a*), remote reporting data (manual call data) is transmitted by the remote reporting key from the copying machine 1 to the communication control unit 18. The communication control unit 18 having received this data originates a call to a telephone number previously set inside of the administrating device 16, and transmits the remote reporting data transmitted by the remote reporting key.

The administrating device 16 is generally provided in a service site. The data transmitted from the communication control unit 18 to the administrating device 16 in this step is allowed only as data of types previously set in the communication control unit 18 among a plurality of types of data which the communication control unit 18 has received from the copying machine 1. This setting can be made from the administrating device 16 to the communication control unit 18 through a public line network 17.

When the communication control unit 18 has transmitted the prespecified data to the administrating device 16, the communication control unit 18 transmits a reporting result report showing a result of the communication between the communication control unit 18 and the administrating device 16 to the copying machine 1 originally transmitting the data. With this feature, the copying machine 1 originally transmitting the data can know whether the communication has normally ended or the communication has not been established due to any abnormality.

A self-diagnosis function is generally provided in a copying machine, so that the messages such as an "error" or a "serviceman call" are sent to a user or a serviceman in a case where any abnormality in a fixing temperature is detected, in a case where adjustment to each of portions to be adjusted can not be made by an electronic volume, or in a case where a copying machine is in a dangerous state or in a state in which the machine is put out of action.

Even when any abnormality is detected by this type of self-diagnosis function in a copying machine, as shown in FIG. 9(*b*), remote reporting data due to abnormality detected in self diagnosis (emergency alarm data) is transmitted from the copying machine 1 to the communication control unit 18. The communication control unit 18 having received the remote reporting data transmits the received data due to abnormality detected in self-diagnosis to the administrating device 16, and transmits a result of the reporting to the copying machine originally transmitting the data when the communication is ended.

Furthermore, in a case where the self-diagnosis function determines that some abnormal state in a copying machine will be realized in substantially the near future although the state has not yet come out (for instance, in a case where a frequency in generation of jamming in a particular paper feeding section becomes higher than that in normal time), and also in a case where the self-diagnosis function determines that supply of toner or copy paper or some other things are short, as shown in FIG. 9(*c*), remote reporting data for an advance alarm (maintenance data for promoting maintenance of the copying machine or supply alarm data for promoting replenishment of the supply or replacement thereof or the like) is transmitted to the communication control unit 18.

In a case where remote reporting due to abnormality detected in self-diagnosis is made, the copying machine is inevitably disabled action, but in a case where the remote reporting is made due to an advance alarm, the copying machine can be kept in the running state, and if a document is set thereon and the start key is pressed, a copying operation is started even during the communication.

In a case where work load to the controller of the copying machine 1 is heavy because of the copying operation in this step, or in a case where contents included in the transmitted data is changed in association with the copying operation, and consistency of data may be lost, the communication may be interrupted. The remote reporting data for an advance alarm is not so much urgent, so that the communication control unit 18 having received the data does not necessarily transmit the data to the administrating device 16 at once, and may transmit the data thereto in any convenient time for the communication, such as in a time zone in which a telephone set 19 or a facsimile device 20 connected to the communication control unit 18 is less utilized, or in a time zone in which an amount of traffic in a public line network 17 is small.

This transmission request time can be set from the administrating device 16 to the communication control unit 18, and the transmission request time can be determined by checking whether the clock 188 shown in FIG. 6 matches the current time or not. In a case of the remote reporting for this advance alarm, which is different from a case of other remote reporting, a reporting result report is not transmitted to the copying machine 1.

Next, a description is made for a case where access from the administrating device to a copying machine is made with reference to FIG. 10.

The access from the administrating device 16 to a copying machine 1 is categorized to three broad types of requests according to the purpose; namely a Read request, a Write request, and an Execute request. The Read request is a processing for reading logging data, various types of set values, and output values from various types of sensors in a copying machine 1, and the Write request is a processing for rewriting various types of set values by transmitting data from the administrating device 16. The Execute request is a processing for making the copying machine 1 execute some tests.

FIGS. 10(*a*), 10(*b*), 10(*c*) show a procedure of communications among the administrating device 16, the communication control unit 18, and a copying machine 1 when each of the requests is issued, but in any cases, communication is established by dialing from the administrating device 16 to the communication control unit 18 connected to a target copying machine 1 to transmit each of the request data thereto. The communication control unit 18 receives the request data from the administrating device 16. The communication control unit 18 having received the request data transmits the data to the target copying machine 1.

The copying machine 1 having received the request data transmits a response to the request to the communication control unit 18 after contents of the request is processed. The communication control unit 18 also transmits the response to the administrating device 16 to finish one of the processing units.

Description is made for a case where access from the administrating device to a communication control unit is made with reference to FIG. 11. The access from the administrating device 16 to the communication control unit 18 is categorized to three broad types of requests according to purposes, such as a Read request, a Write request, and an Execute request. FIGS. 11(*a*), 11(*b*), and 11(*c*) show a procedure of each of the processings in this step.

The Read request is a processing for reading parameters set in or status of the communication control unit 18, or for reading the parameters or status in a case where the communication control unit 18 previously reads out data inside of the copying machine 1 and has the data stored in the communication control unit 18. The Write request is a processing for setting parameters for the communication control unit 18 by sending data from the administrating device 16 thereto. The execute request is a processing for having the communication control unit 18 execute testing operations such as a functional check.

Figure 12:
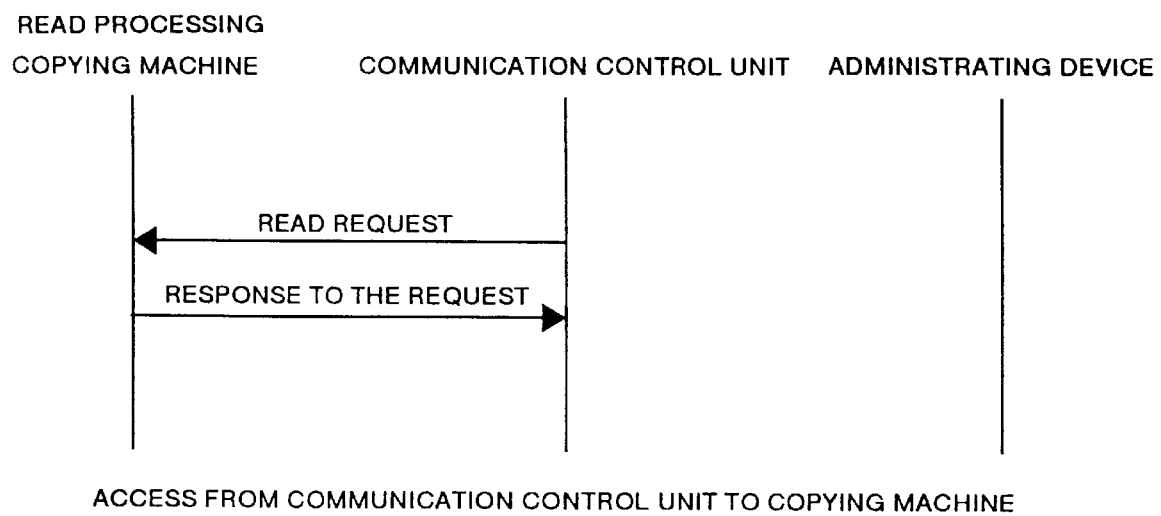
FIG. 12 is a communication sequence view in a case where the communication control unit also accesses the copying machine without using the administrating device.

Description is made for access from a communication control unit to a copying machine without using the administrating device with reference to FIG. 12.

The access from the communication control unit 18 to a copying machine 1 is a read processing for reading data inside of the copying machine 1 by the communication control unit 18 to store the read data inside of the communication control unit 18, and so that the administrating device 16 can read out the data subsequently according to the necessity.

Generally, a counter value of a total number of copied sheets is used for a maintenance contract of a copying machine or for maintaining the copying machine. A counter value of a total number of copied sheets is periodically transmitted from the copying machine 1 to the communication control unit 18 by using this system, so that it becomes possible for the administrating device 16 to check the counter value even when communication with the copying machine 1 can not be established caused by a case where the power in the copying machine 1 is disconnected or some other reasons.

For achieving this function, as described above, the function, in which the communication control unit 18 reads data inside of the copying machine 1 and stores the read data therein, is utilized. The communication control unit 18 issues a request for outputting data for a total number of copied sheets of paper to all of copying machines connected thereto successively one by one every day at a point of time to collect a total counter value in the parameter set in the communication control unit 18 providing the clock 188 (FIG. 6) in the communication control unit 18 as a reference.

Then, the value read on the previous day is updated to the responded new data for a total number of copied sheets of paper in the copying machine having returned a response including the date and time when the new data is obtained, and the updated new data is stored in the backed-up RAM 186 (FIG. 6) in the communication control unit 18. Also, in a case where the communication can not be established like in a case where a power for the copying machine to which data for a total number of copied sheets of paper is requested is disconnected, response and reception of the data from the copying machine is put off, and a processing is carried out to the next copying machine.

A request is issued again only to the copying machine which could not receive the request at a point of time when the request has been issued to all the copying machines. Normally, time to collect a total counter value is set during, for instance, night time when a power for any copying machine is conceivable to be disconnected, a power for each of the copying machines is turned ON one by one in association with elapse of time, and the communication with each of them is executed while each of the copying machines is idling or adjusting each section immediately after a power is turned ON.

To transfer data for a total number of copied sheets of paper stored and held in the RAM 186 of the communication control unit 18 to the administrating device 16, there are two types of methods: one is a method for reading the data by periodically accessing the administrating device 16 on the closing date of every month, and the other is a method in which the communication control unit 18 automatically transmits the data to the administrating device 16 when time reaches the date and time for automatically originating a call for a total counter value set in the communication control unit 18.

Selection of the methods is set by the total counter value automatic call permission switch 189 (FIG. 6) provided in the communication control unit 18. In a case where this switch is ON, and when time reaches the date and time indicated by the parameters set in the communication control unit 18, the communication control unit 18 originates a call to a telephone number for the destination of reporting indicated by the parameters set therein, and transmits a counter value for a total number of copied sheets of paper to the administrating device 16. When this switch 189 is OFF, an automatic call is not originated, and the access made by the administrating device 16 is expected.

In this example, it is assumed that data indicating a number of communications periodically executed is regarded as a counter value for a total number of copied sheets of paper, but data other than the data described above may be used for the value, or communication may be executed with other data added thereto.

The communication control unit 18 can control a plurality of copying machines 1, and can sequentially obtain data therefrom but is rarely connected to all the units to be installed therein, so that it is possible in this system not to have the communication control unit request data from any copying machine which has not yet connected, which reduces a period of time required for an access.

FIG. 13 shows a list of the parameters set in the communication control unit 18. A model number and a serial number of a copying machine are registered for a copying machine at each address, these numbers are used for transmitting data to the administrating device 16 by adding these numbers thereto when the data is reported from any copying machine 1, or for deciding an address for a copying machine 1 to be selected when an access is made by the administrating device 16.

Also, a telephone number for destination of each remote reporting, a number of redialing and an interval between redialings, and types of data to be transmitted to the administrating device 16 are set for each reason of remote reporting. Reporting time to the administrating device 16 is also set in remote reporting for a previous alarm. A checksum is added to each block of the parameter, so that, in a case where any value for a parameter is changed or lost due to malfunction of the communication control unit 18, exhaustion of a back-up battery 187, or any error on the communications or some other reasons, the reason can be detected according to the checksum.

These parameters are written in the communication control unit from the administrating device 16 through the public line network 17, but the parameters may be written in the communication control unit by directly connecting a portable unit for setting parameters thereto, or an operating means may be provided on the communication control unit 18 and the parameters may be set thereby.

Setting parameters is an important function, so that the confidentiality is enhanced by adding an ID (password) to the communication data.

This ID is not decided specifically to each of communication control units 18, but is decided when parameters are specified for the first time (when parameters have not been decided yet in FIG. 13), and after this step on, the ID can not be changed by any communications, but is enabled by manually initializing the communication control unit 18.

The ID is checked each time when communication is executed, so that access from other systems and entry of erroneous data is impossible. Also when a different ID is received a prespecified number of times, this error is stored inside of the unit, and is informed to a supervisor of the system by automatically reporting it to the administrating device 16. Any hackers or similar ones are checked out by checking this ID whenever communication is executed.

It should be noted that the ID can not be changed by means of communications or the like as described above, but may be changed by using, for instance, another ID (for changing an ID).

FIG. 14 is an example of a format of communication data when remote reporting is executed. FIG. 14(*a*) shows a data format from a copying machine to a communication control unit. A header field is reporting a reason code, and indicates a type of reporting; namely one of a remote reporting with a remote reporting key, a remote reporting according to abnormality detected in self-diagnosis, and a remote reporting according to an advance alarm. The code described above is followed by data from a copying machine. The "copying machine condition" indicates data concerning a state of supply (consumable goods) such as toner, oil, and copy paper or the like; various types of output values from sensors; various types of preset values for sections to be adjusted; and a connecting state of a unit or some other state.

FIG. 14(*b*) shows a data format from the communication control unit 18 to the administrating device 16. In addition to the data from a copying machine 1, to identify a copying machine which becomes a header data generating source, a field for a model number as well as for a serial number is added thereto. Also, a time when a cause for reporting is generated is added to the rear section of the data with the clock 188 in the communication control unit 18. As for the data portion, a type of data to be transmitted to the administrating device 16 varies according to the parameter set in the communication control unit 18, but this example assumes a case where parameters were set in the communication control unit 18 so that only times of generation of abnormality detected in self-diagnosis and a copying machine condition are transmitted to the administrating device 16.

FIG. 14(*c*) shows a data format for a reporting result report to be transmitted to the copying machine at a point of time when a report from the communication control unit 18 to the administrating device 16 comes to the end.

FIG. 15 shows a data format when, of various types of access from the administrating device 16 to a copying machine 1, a Read processing is executed. Request code indicating a Read processing and code for an item to be read are transmitted from the administrating device 16 to the communication control unit 18 in succession to a model number and a serial number of the target copying machine 1.

The field for the model number and serial number are removed, and only Read request code and item code are transmitted from the communication control unit 18 to a copying machine 1. The copying machine having received the codes transmits the required data to the communication control unit 18 in succession to the read response code and item code. The communication control unit 18 adds the model number and serial number to the data again and transmits the data to the administrating device 16.

Figure 16:
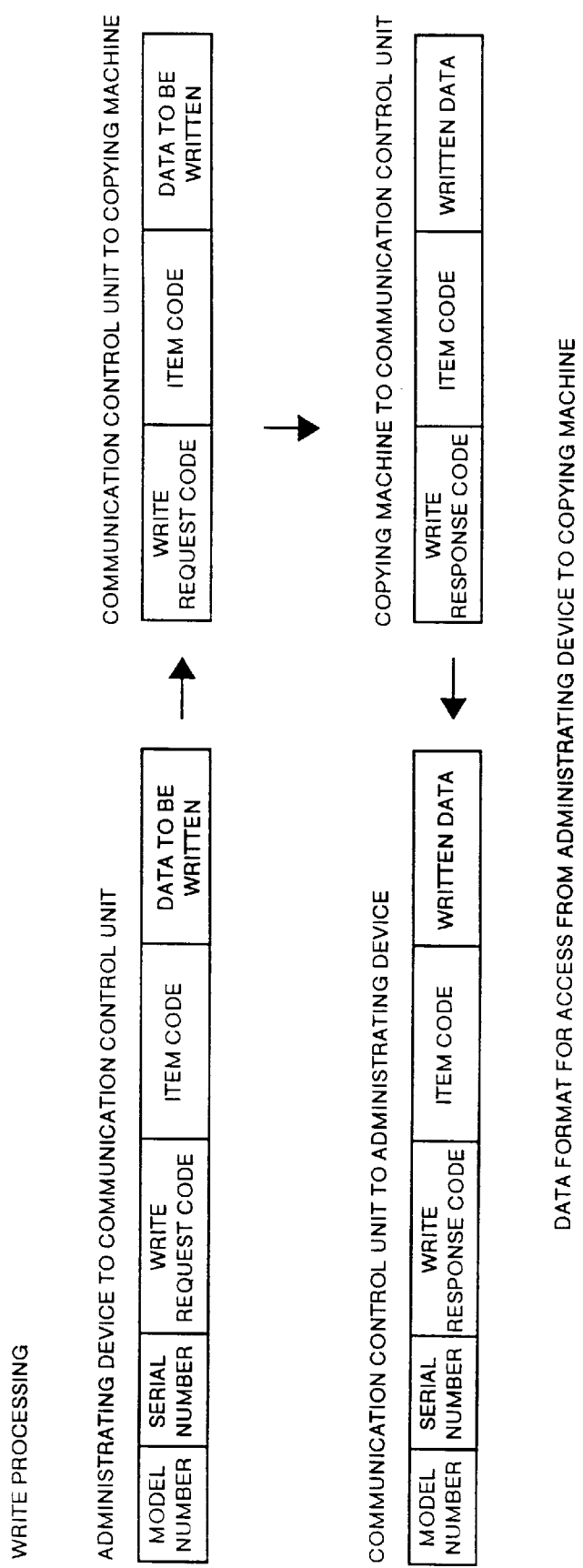
FIG. 16 is a view showing an example of a data format when a Write processing is executed.

FIG. 16 shows a data format used when a Write processing is executed. In this case, different from a case of Read processing, data to be written is added to the data following the item code, in the communication to the copying machine 1. In the communication to the administrating device 16, data actually written in the copying machine 1 is transmitted thereto following the field of the item code. Generally, the data to be written which the copying machine has received coincides with the written data which the copying machine transmits, but sometimes there is a case where data may be rounded to the boundary value and written in the copying machine when the received data is out of the effective range, and in this case the two data do not coincide with each other.

FIG. 17 shows a data format used when the Execute processing is performed. In this case, in the communication to the copying machine 1, code for supplementing contents of the operation follows the item code in a case where an object for the operation can not be identified only by the item code. The copying machine 1 having executed the requested operation transmits the operation result data to the administrating device 16.

FIG. 18 shows data formats each used when access is made from the administrating device 16 to the communication control unit 18, and FIG. 18(*a*) shows a format used when a Read processing is executed, FIG. 18(*b*) shows one used when a Write processing is executed, and FIG. 18(*c*) shows one used when an Execute processing is performed.

These data formats are substantially identical to those used when access to the copying machine 1 is made, and the code indicating a communication control unit 18 is substituted for the model number and serial number.

FIG. 19 shows a data format used when an access is made from the communication control unit 18 to a copying machine 1. The data format is identical to the data format transmitted between the communication control unit 18 and copying machine 1 in a case where access is made from the administrating device 16 to the copying machine 1 shown in FIG. 15 to FIG. 17, so that it is not required for the copying machine 1 to differentiate the access from the communication control unit 18 from that made by the administrating device 16, which makes it possible to handle these access in the same manner.

It should be noted that only one unit of administrating device 16 is shown in FIG. 5, but actually machines are repaired by a person from the service center, and a number of copied sheets of paper or the like is kept in another site. In this embodiment, machines are provided for these operations, so that description is made for the operation of the machine.

The report reason code is appended to reporting data from a copying machine 1 to a communication control unit 18 as shown in FIG. 14(a). The communication control unit 18 categorizes the reporting data to any of those shown below in (1) to (4) by identifying the report reason code from other ones.

(1) data entered with the remote reporting key
(2) data according to abnormality detected in self-diagnosis
(3) data according to an advance alarm
(4) data according to a total counter value The communication control unit 18 stores the reporting data categorized as described above in the memory inside thereof, selects a telephone number for destination of reporting from the parameters as shown in FIG. 13, and transmits the data to the telephone having the selected telephone number.

For this reason, copying machines can be put under centralized control by making identical telephone numbers each for destination to be reported in each category, while the copying machines can be controlled discretely at each the site by differentiating telephone numbers each for destination to be reported.

FIG. 20 is a flow chart showing a main routine for reporting control by the CPU 100 in the copying machine 1 shown in FIG. 8.

In a case where the communication permission switch 111, provided outside the operating section 70 in the copying machine 1, is ON, and when it is determined that a remote reporting key 83 in the operating section 70 was depressed, that any abnormality was detected in a self-diagnosis, or that an advance alarm is required, a remote reporting corresponding to the determined state is executed.

Figure 21:
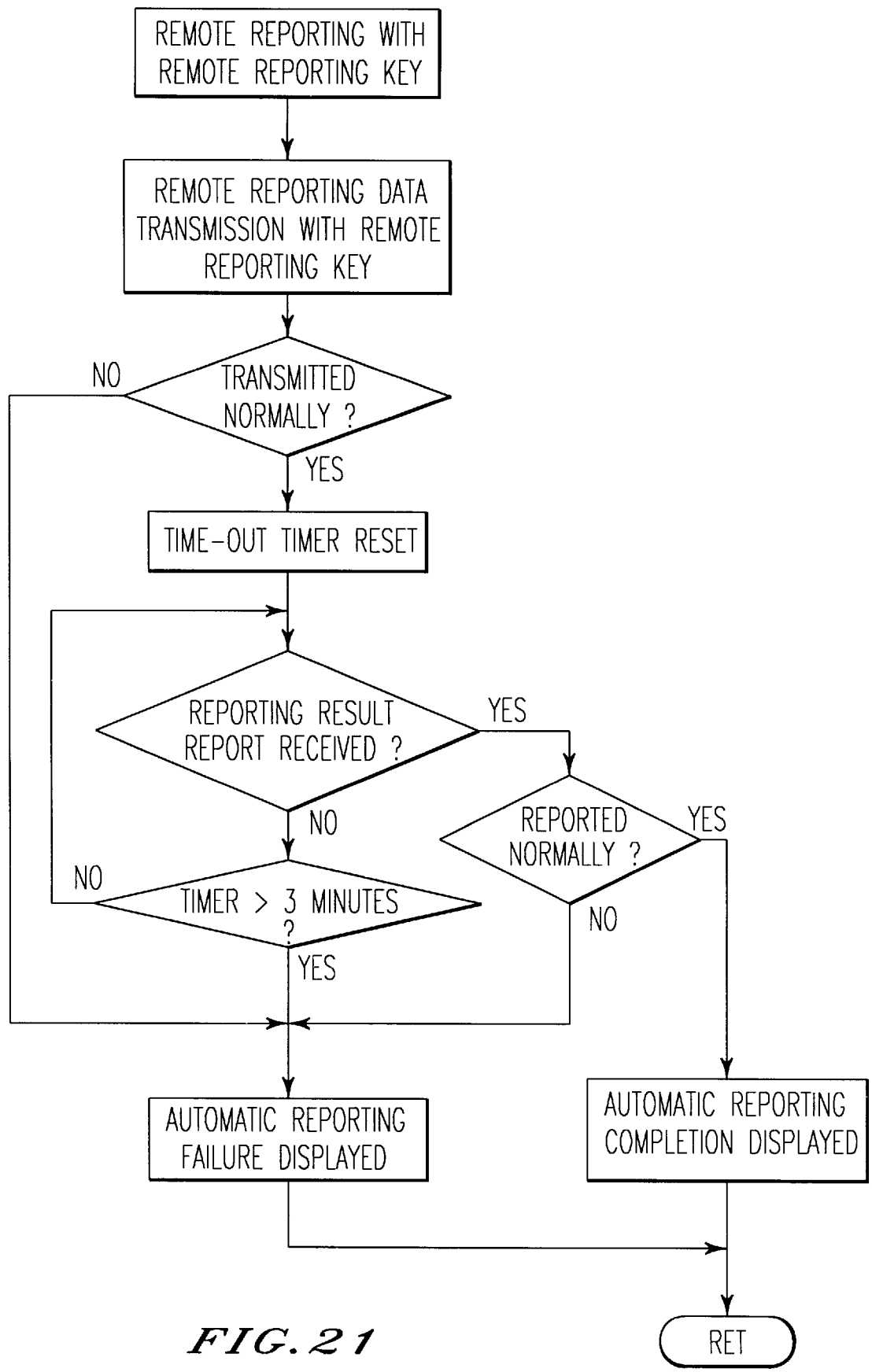
FIG. 21 is a flow chart showing contents of processing in a subroutine for remote reporting executed by a remote reporting key in FIG. 20.

FIG. 21 is a flow chart showing a processing contents of a subroutine for remote reporting with the remote reporting key shown in FIG. 20.

At first, remote reporting data is transmitted with the remote reporting key to the communication control unit 18. In a case where reporting is not normally carried out, for instance, when there is no response from the communication control unit 18 or similar cases, the copying machine informs a user that some abnormality has been generated therein by lighting up or blinking the remote reporting abnormality display D8 (FIG. 4) on the operating section 70.

In a case where data is normally transmitted to the communication control unit 18, a timer for determination of timeout is reset, and a reporting result report from the communication control unit 18 is waited for. In this example, a period of time for timeout is set to 3 minutes, so that a case where the reporting result report is not received within 3 minutes is regarded as a timeout, and failure of the reporting thereto is informed to the user also by lighting up or blinking the remote reporting abnormality display D8 on the operating section 70.

In a case where a reporting result report is received within the period of time for timeout, determination is made from the result as to whether or not the reporting has correctly been carried out, and when it is determined that the reporting has correctly been executed, the fact that an automatic reporting has been completed is displayed (the illustration is omitted herein), and the fact that it has been failed is displayed also by lighting up or blinking the remote reporting abnormality display D8, and system control returns to the main routine shown in FIG. 20.

Figure 22:
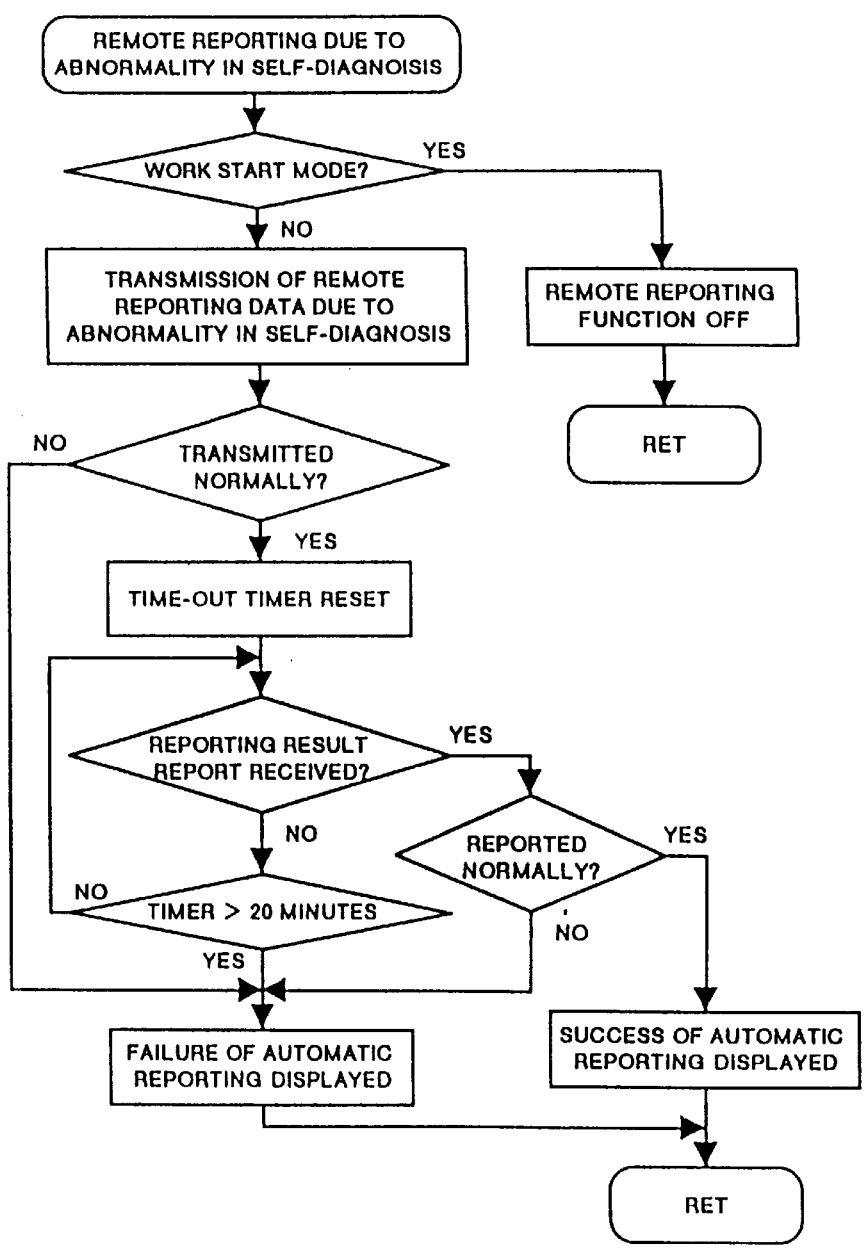
FIG. 22 is a flow chart showing contents of processing in a subroutine for remote reporting executed in a case of abnormality detected in self diagnosis in FIG. 20.

FIG. 22 is a flow chart showing processing contents of a subroutine for remote reporting executed when any abnormality is detected in self-diagnosis also shown in FIG. 20.

At first, determination is made as to whether or not the work start mode (described later) has been selected, and if the work start mode has been selected, a function of remote reporting is turned OFF and left as it is, and system control returns to the main routine shown in FIG. 20.

If the work start mode has not been selected, remote reporting data concerning the abnormality detected in self-diagnosis is transmitted to the communication control unit 18.

A processing subsequent to this step is the same as the remote reporting processing by the remote reporting key described in FIG. 21 excluding the point that a period of time for time out is 20 minutes, so that description thereof is omitted herein.

Figure 23:
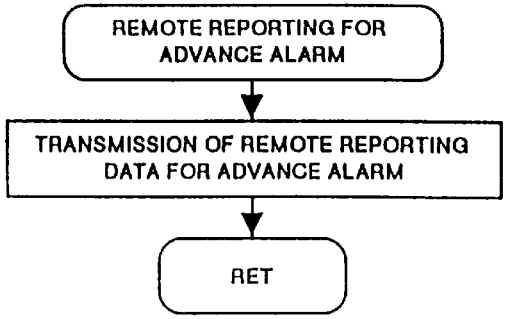
FIG. 23 is a flow chart showing contents of processing in a subroutine for remote reporting executed according to an advance alarm in FIG. 20.

FIG. 23 is a flow chart showing a processing contents of a subroutine for remote reporting for an advance alarm also shown in FIG. 20.

In this routine, remote reporting data for an advance alarm is transmitted to the communication control unit 18.

Figure 24:
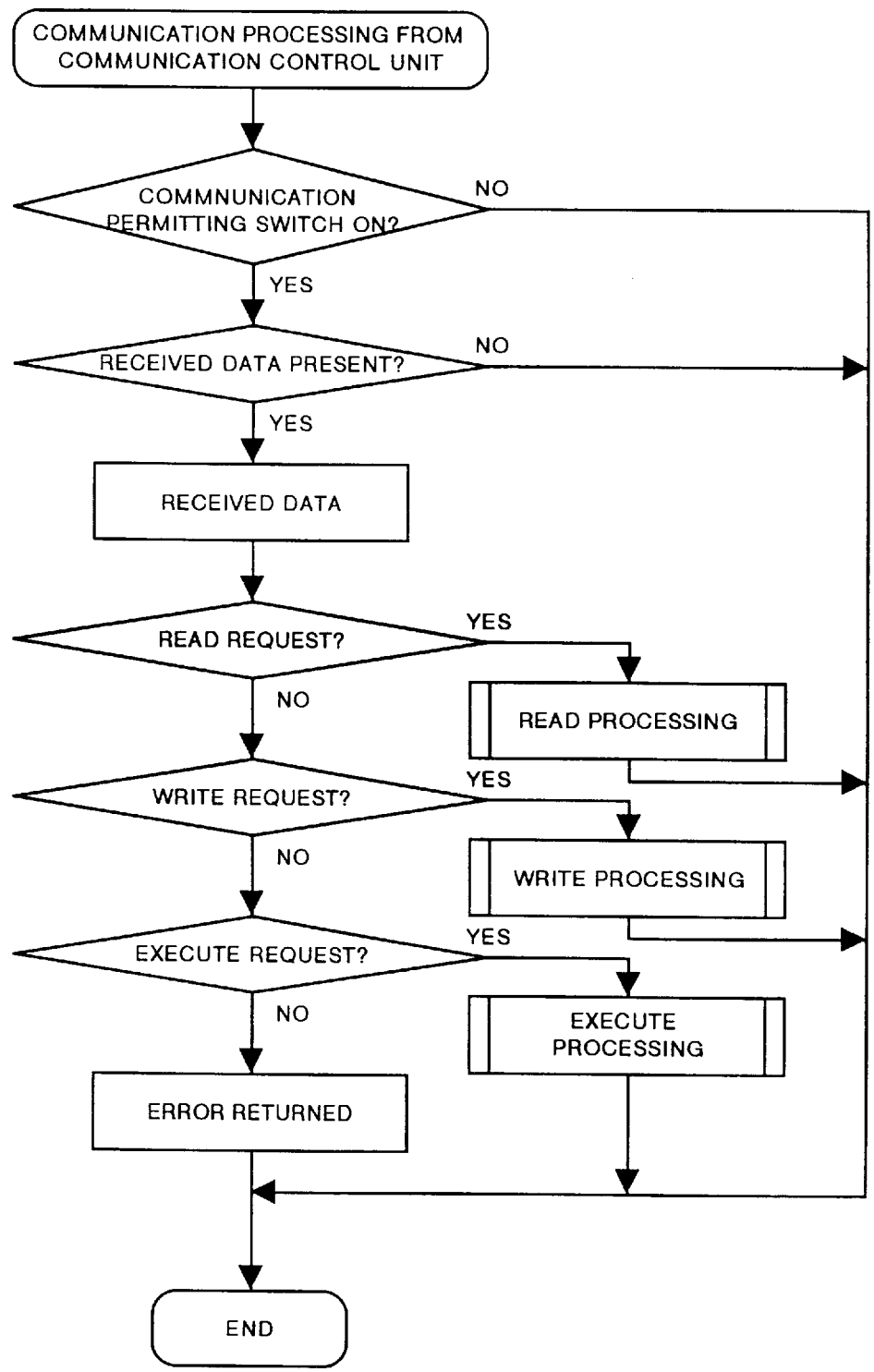
FIG. 24 is a flow chart showing a main routine for processing according to the CPU in the copying machine in a case where access is made thereto from the communication control unit.

FIG. 24 is a flow chart showing a main routine for a processing by the CPU 100 in a copying machine 1 in a case where access is made by the communication control unit 18.

In a case where the communication permission switch 111 shown in FIG. 8 is ON, and if the communication interface unit 109 has received data, a copying machine 1 receives the data, determines a requested processing according to the header field of the data, namely a Read request, a Write request, or an Execute request is to be executed, and the processing according to a result of the determination is executed. If the request is not any of the requests described above, an error code is sent back thereto, and the processing is finished.

Figure 25:
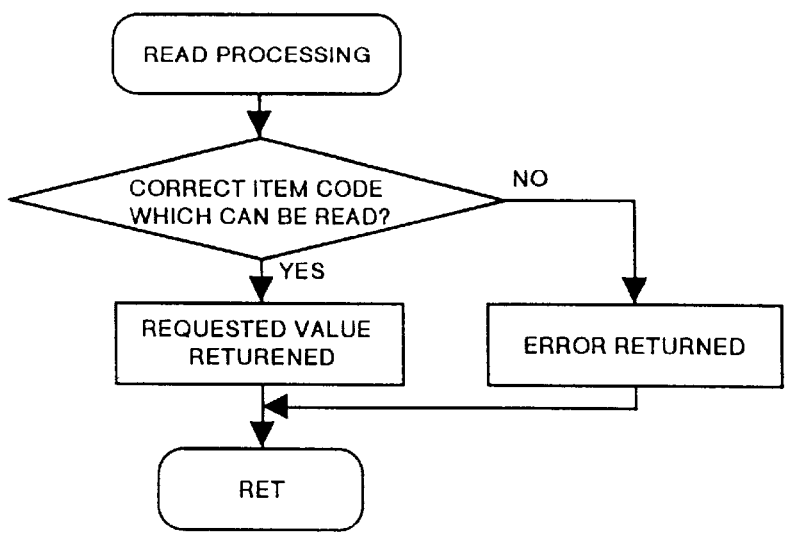
FIG. 25 is a flow chart showing contents of processing in a subroutine for a Read processing in FIG. 24.

FIG. 25 is a flow chart showing a processing contents of a subroutine for a Read processing showing in FIG. 24. In this routine, if the item code received by a copying machine 1 is a correct one with which data can be read, the requested data is sent back to the communication control unit, and if the code is not correct, an error code is sent back thereto.

Figure 26:
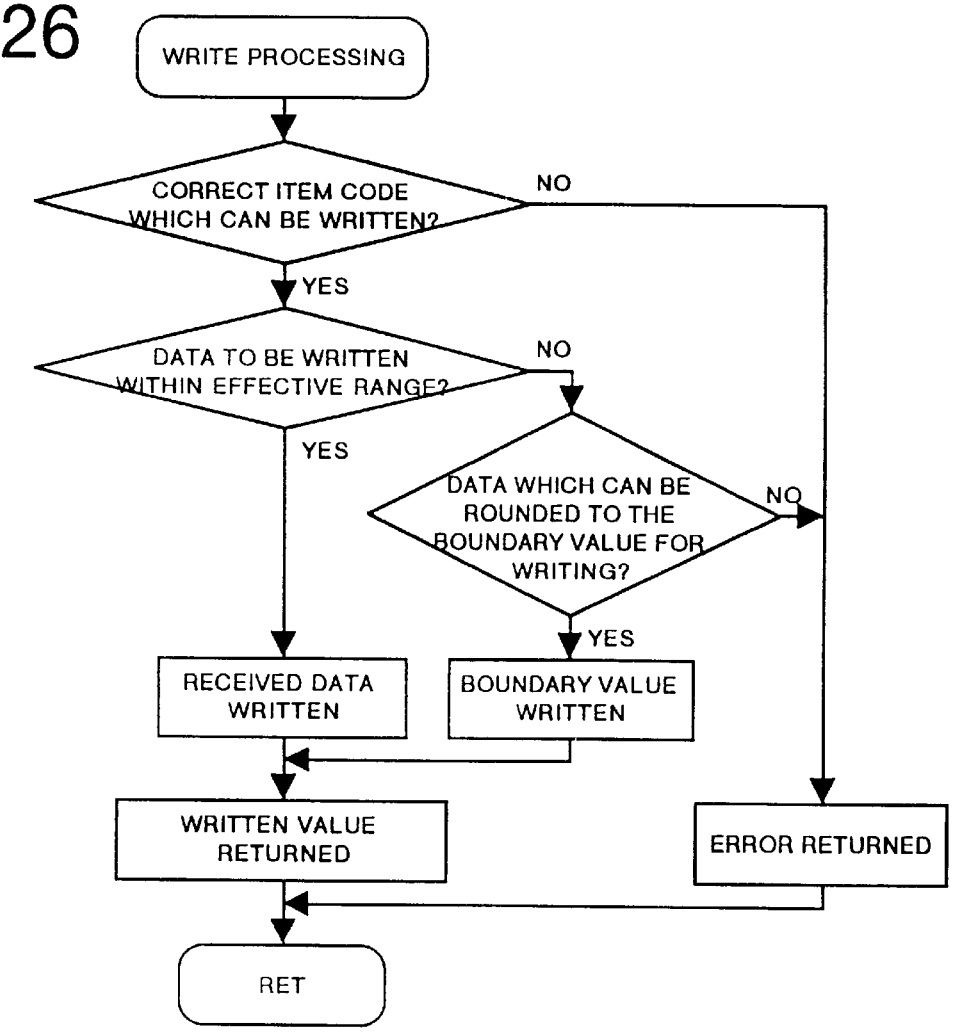
FIG. 26 is a flow chart showing contents of processing in a subroutine for a Write processing in FIG. 24.

FIG. 26 is a flow chart showing a processing contents of a subroutine for a Write processing showing in FIG. 24. In this routine, if the received item code is not a correct one with which data can be written, an error code is sent back to the communication control unit, and if the code is correct, the value to be written is checked, and if the value is within an effective range, the received value is written in the copying machine without any change thereto. When the value is out of the effective range, and if the item is one in which the data may be rounded to the boundary value in the effective range and written in the copying machine, the boundary value is written therein. Otherwise, an error code is sent back to the communication control unit, and system control returns to the main routine.

Whether or not data may be rounded to the boundary value and written therein is decided for each item code. Data which gives large effects to system operation when rewritten even if the data is within the effect range like a temperature for fixing and a telephone number of the service center or some other number in which the numerical value itself is meaningless are inhibited to be rounded to the boundary value, and items such as a period of time for auto-reset in which image quality is not affected is permitted to be rounded to the boundary value for the convenience. For instance, in a case where a user wants to make a period of time for auto-reset as long as possible, and if a value to be written is set to a maximum value to a digit, the maximum value is automatically selected by the copying machine.

Figure 27:
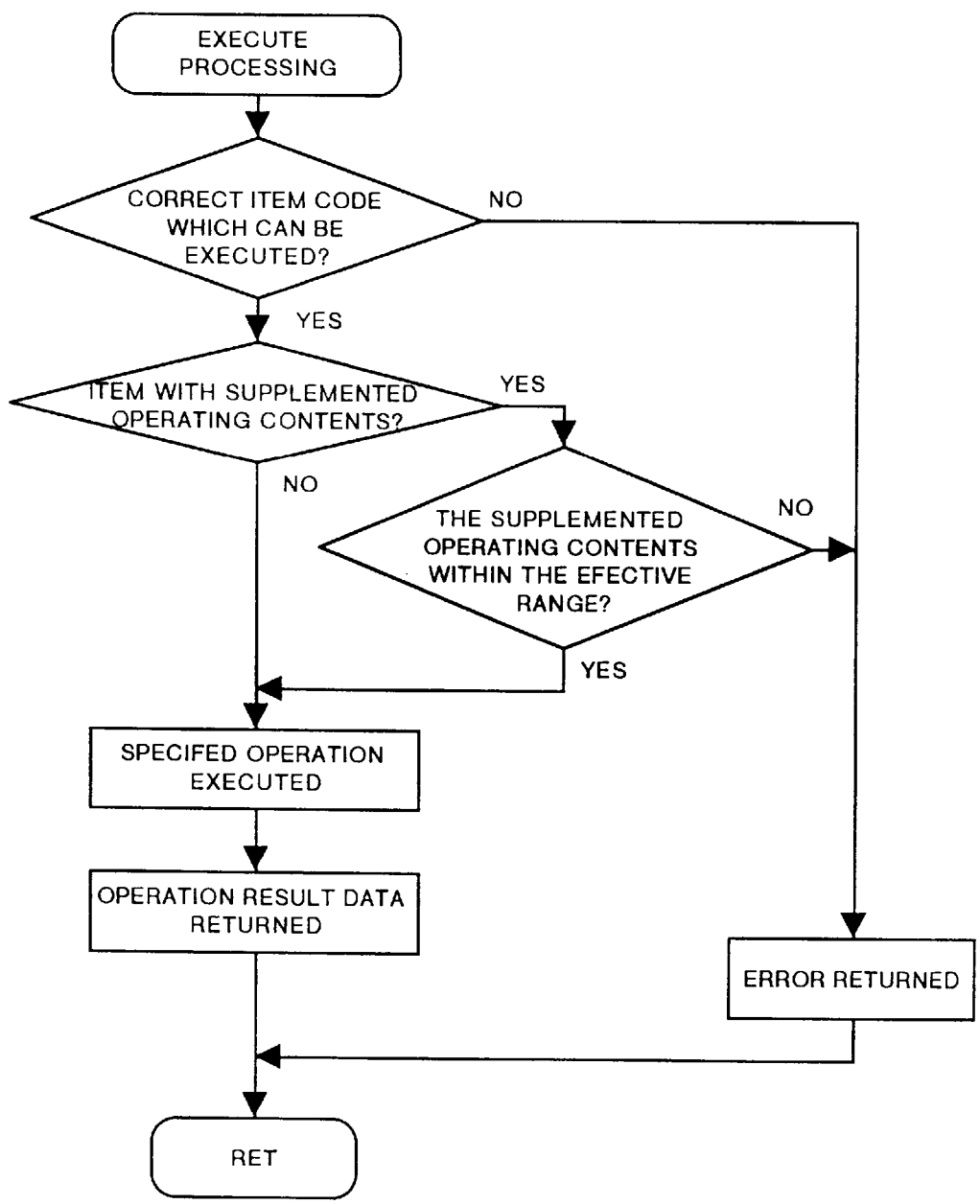
FIG. 27 is a flow chart showing contents of processing in a subroutine for an Execute processing in FIG. 24.

FIG. 27 is a flow chart showing a processing contents of a subroutine for an Execute processing showing in FIG. 24.

In this routine, if the received item code is not a correct and executed one, an error code is returned to the communication control unit, and if the code is correct, determination is made as to whether or not it is an item to which some more additional operating contents are required, and if the additional contents are not required, the specified operation is executed, and data for a result of the operation is returned to the communication control unit. If it is an item which requires additional operation contents, an operation is executed according to the added data, and if the additional operation contents are data out of the effective range, an error code is transmitted to the communication control unit, and system control returns to the main routine.

Figure 28:
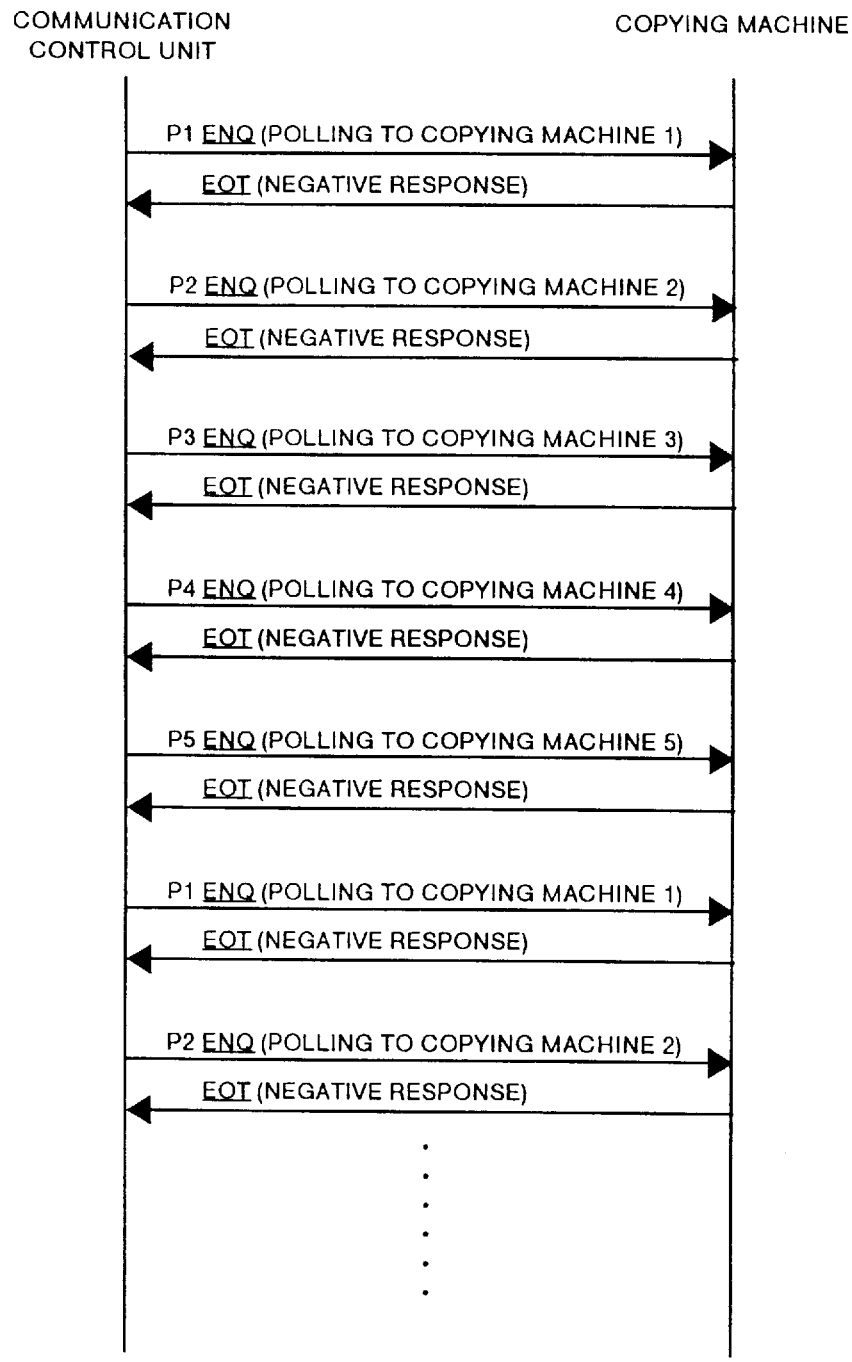
FIG. 28 is a communication sequence view showing an idling state in a case where 5 units of copying machines are connected to the communication control unit.

Next description is made for procedure of the communication between the communication control unit 18 and the copying machine 1. FIG. 28 shows a communication sequence in the idling state in a case where 5 units of copying machines are connected to the communication control unit 18.

The communication control unit 18 executes a polling cycle for successively transmitting a polling sequence by using a polling address for each of the copying machines 1. The copying machine 1 being polled according to its polling address transmits a negative response (data indicating no data to transmit), if it has no data (text) to transmit, to the communication control unit 18. The communication control unit 18 repeats this polling cycle under the normal state in which other communication is not processed.

Figure 29:
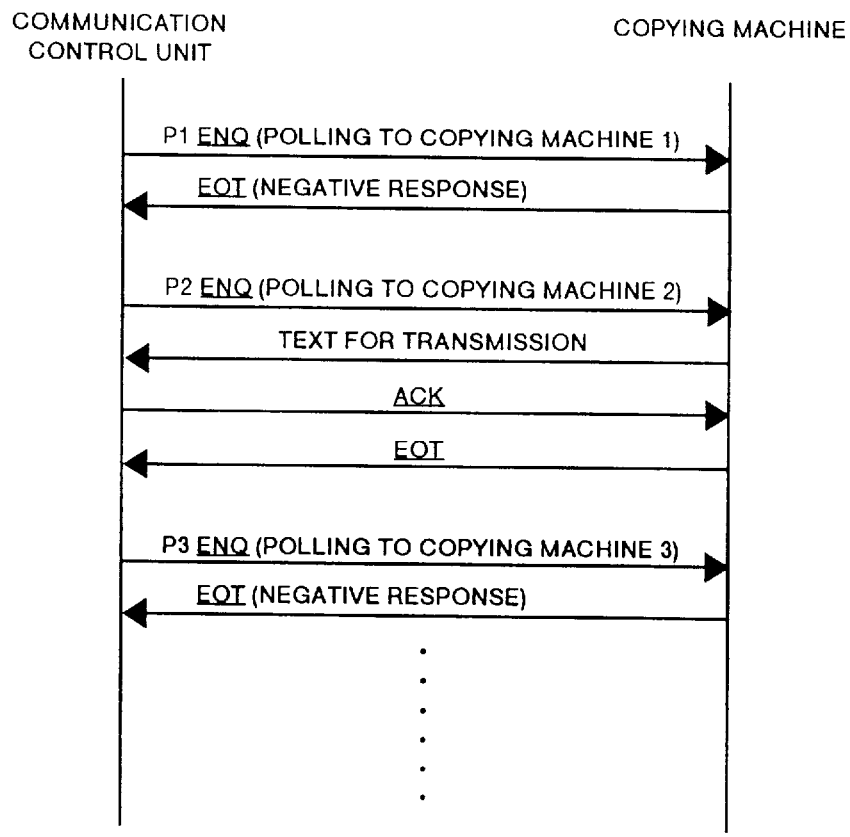
FIG. 29 is a communication sequence view in a case where a copying machine in Address 2 has a transmission text for remote reporting.

FIG. 29 shows an example of a communication sequence in a case where a copying machine at address 2 has a text to transmit for remote reporting. The copying machine being polled according to its address transmits the text to the RS-485 line.

Figure 30:
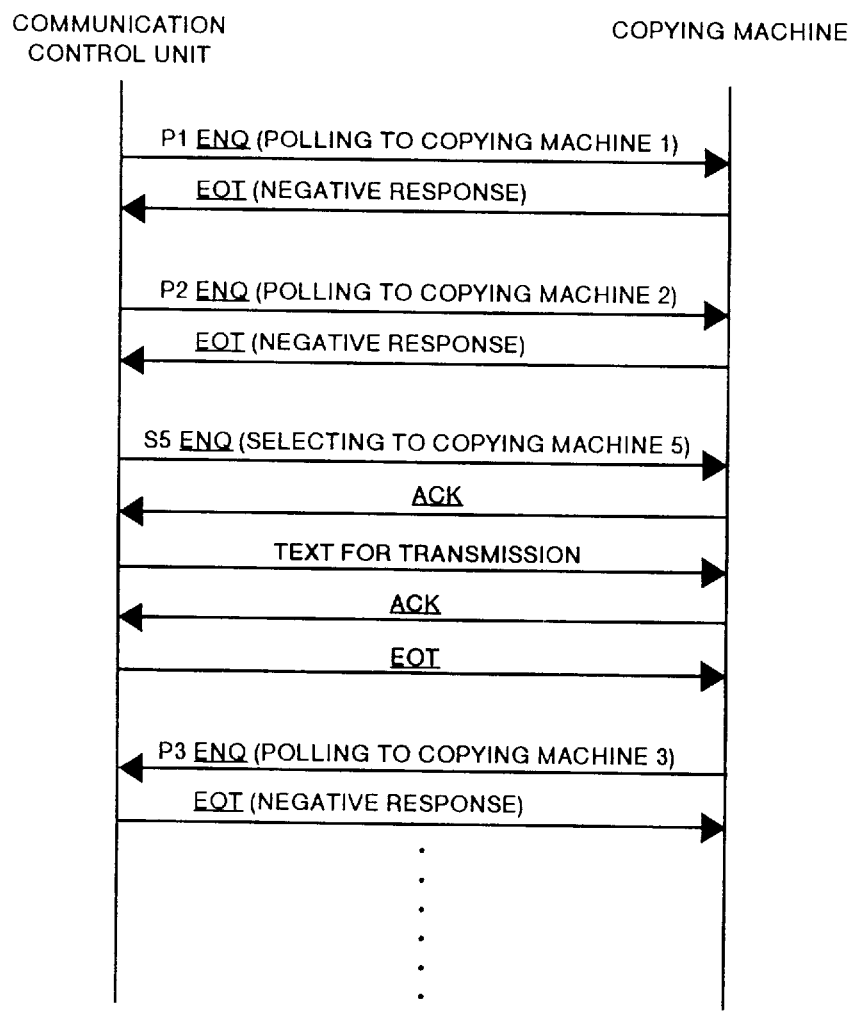
FIG. 30 is a communication sequence view in a case where a text for a reporting result is transmitted from the communication control unit to a copying machine in Address 5.

FIG. 30 shows an example of a communication sequence in a case where a text of a reporting result report is transmitted from the communication control unit 18 to the copying machine at address 5. When polling, which is currently executed, is finished, a text is transmitted to the copying machine by transmitting a selecting sequence by using a selecting address for the target copying machine. After the text is transmitted, system control returns to the original polling cycle.

Figure 31:
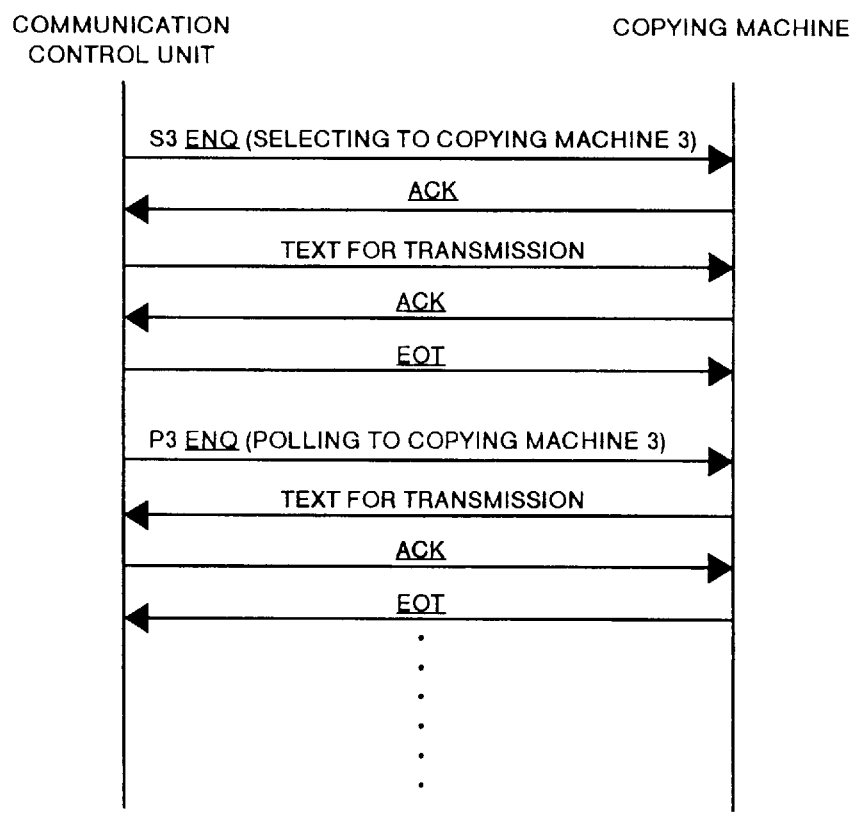
FIG. 31 is a communication sequence view between the communication control unit and a copying machine in a case where the administrating device or the communication control unit accesses a copying machine in Address 3.

FIG. 31 is a communication sequence between a communication control unit 16 and a copying machine 1 in a case where access is made from the administrating device 16 or the communication control unit 18 to the copying machine at address 3.

In this case, the communication control unit 18 selects a target copying machine, transmits any texts for a Read request, a Write request, and an Execute request. Polling is executed to the same copying machine immediately after the text is transmitted, and a response to the request is received. Actually, this sequence is inserted into the polling cycle shown in FIG. 28.

Figure 32A:
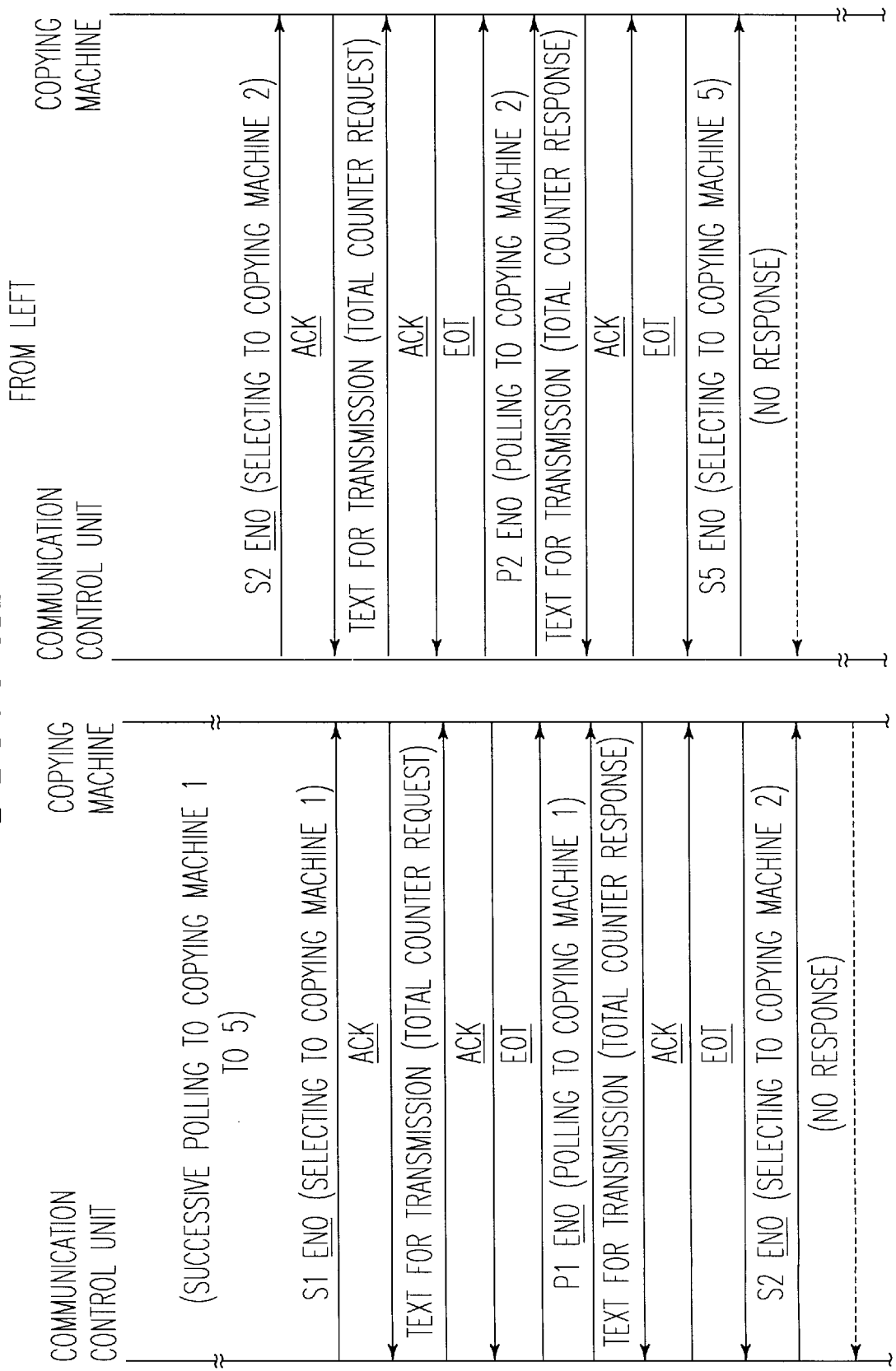
FIG. 32 is a communication sequence view between the communication control unit and a copying machine when a total counter value is transferred, which is periodically executed.
Figure 32C:
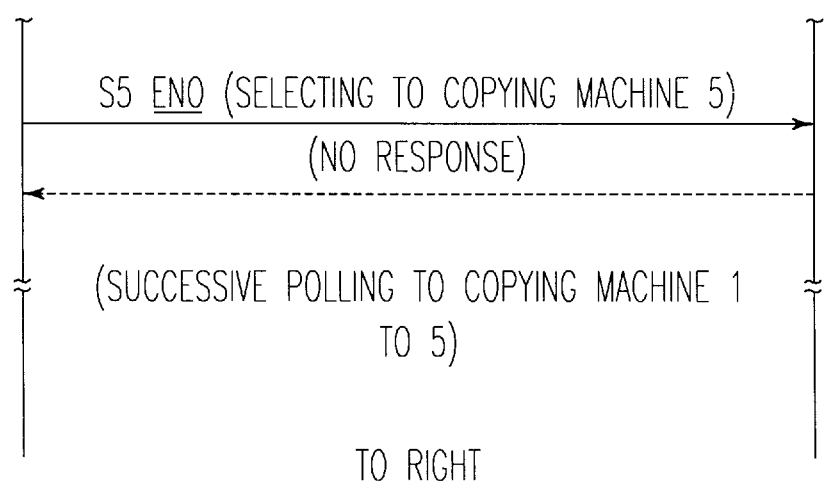

FIG. 32 is an example of a communication sequence used when a total counter value is periodically transmitted to the unit. When it reaches the date and time when a counter value for a total number of copied sheets of paper (a total counter value) is collected, the communication control unit 18 inserts a selecting cycle in which selecting is successively executed to copying machines at addresses 1 to 5 at an interval between the polling cycles. In a case where a response is returned during the selecting cycle, data (a total counter value) is received by polling to the same copy machine immediately after this step, and in the next selecting cycle, selecting is not executed to the copying machine. In this example, there is a response from each of copying machines at addresses 1, 3, and 4 in the first selecting cycle, so that in the next selecting cycle, selecting is executed only to the copying machines at addresses 2 and 5 which could not receive the previous data. Then data from all of the copying machines has been received in the following selecting cycle, and system control returns to a state in which only a normal polling cycle is executed as shown in FIG. 28.

Figure 33A:
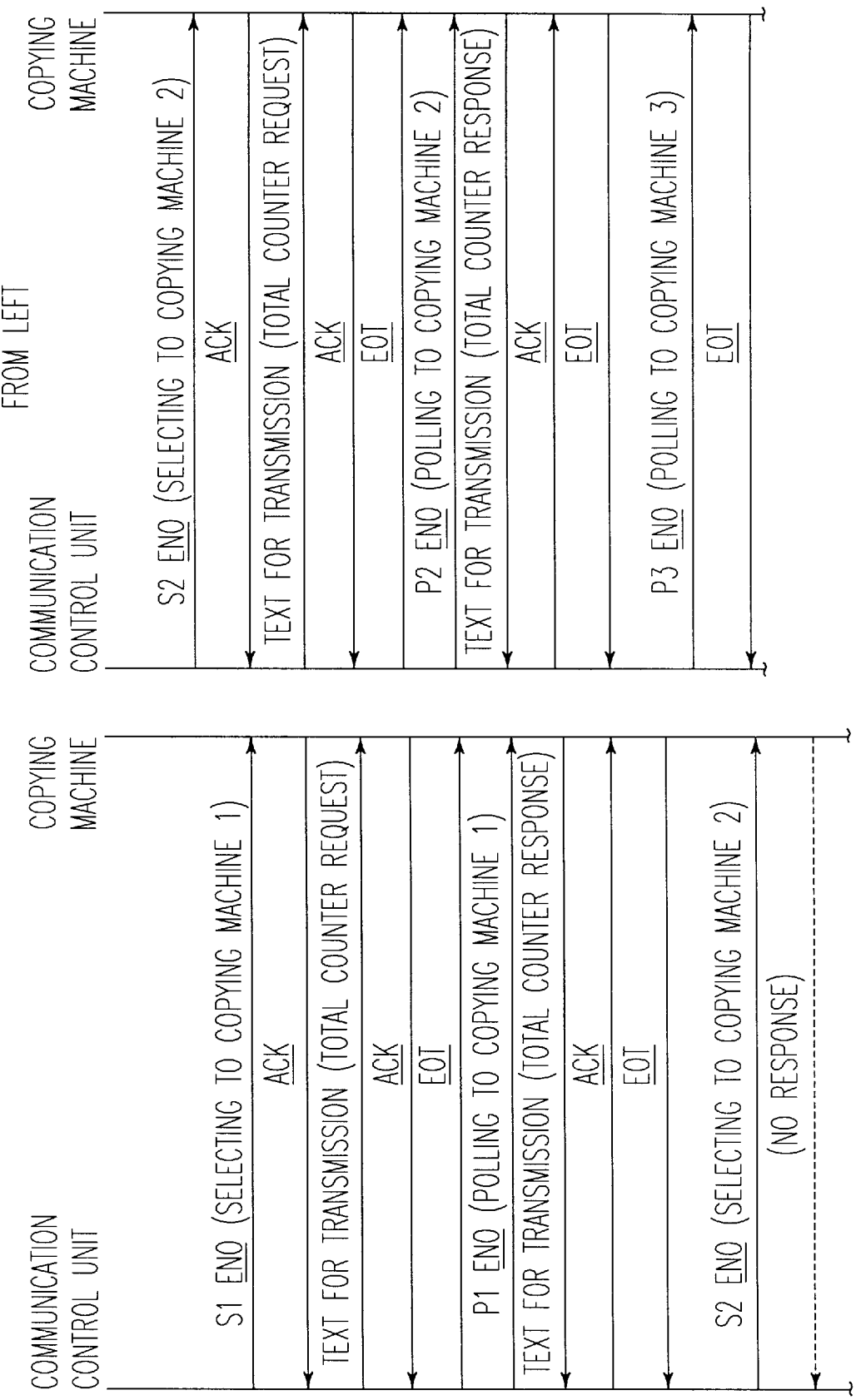
FIG. 33 is another communication sequence view between the communication control unit and a copying machine when a total counter value is transferred, which is periodically executed.
Figure 33B:
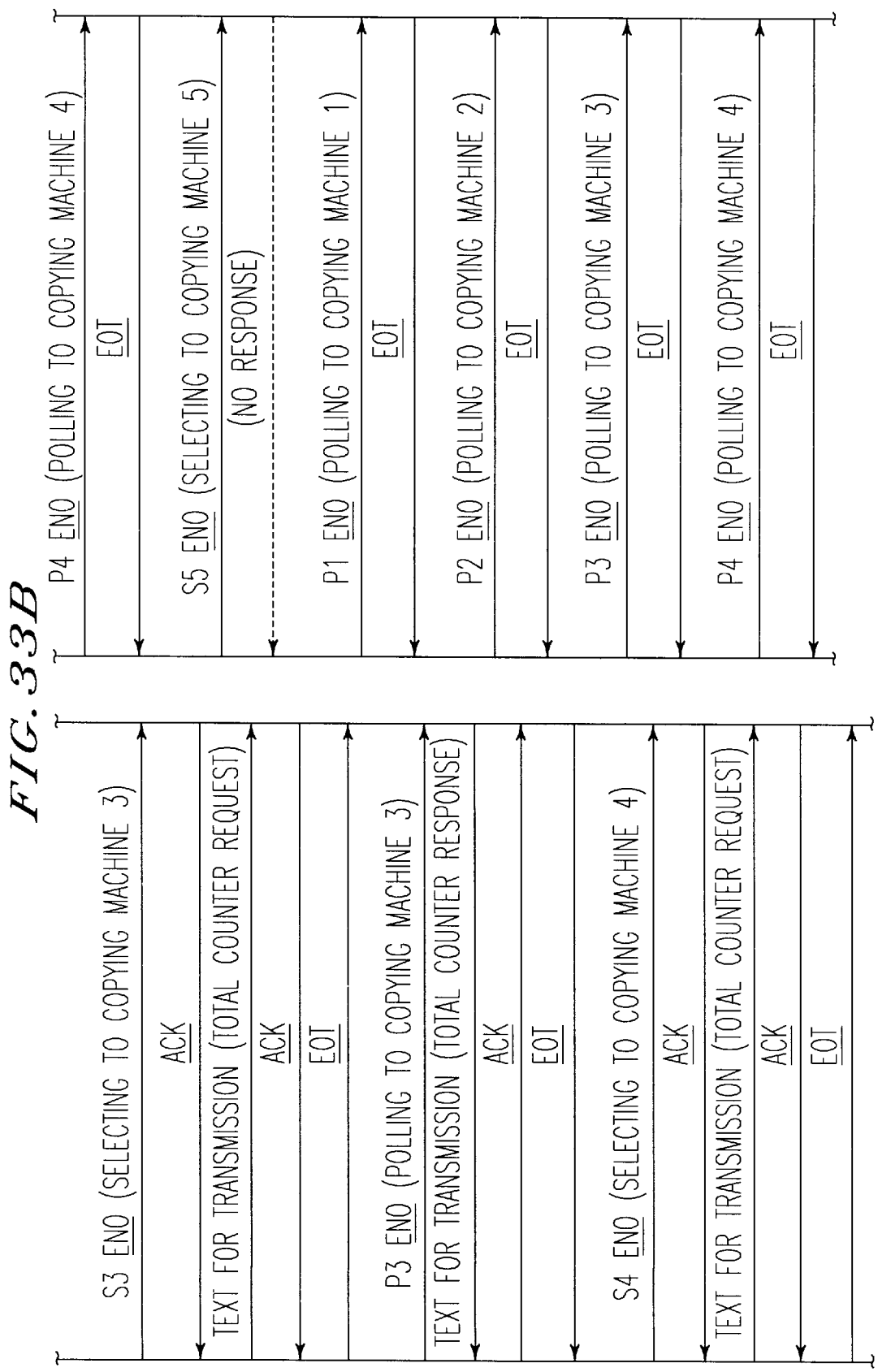
Figure 33C:
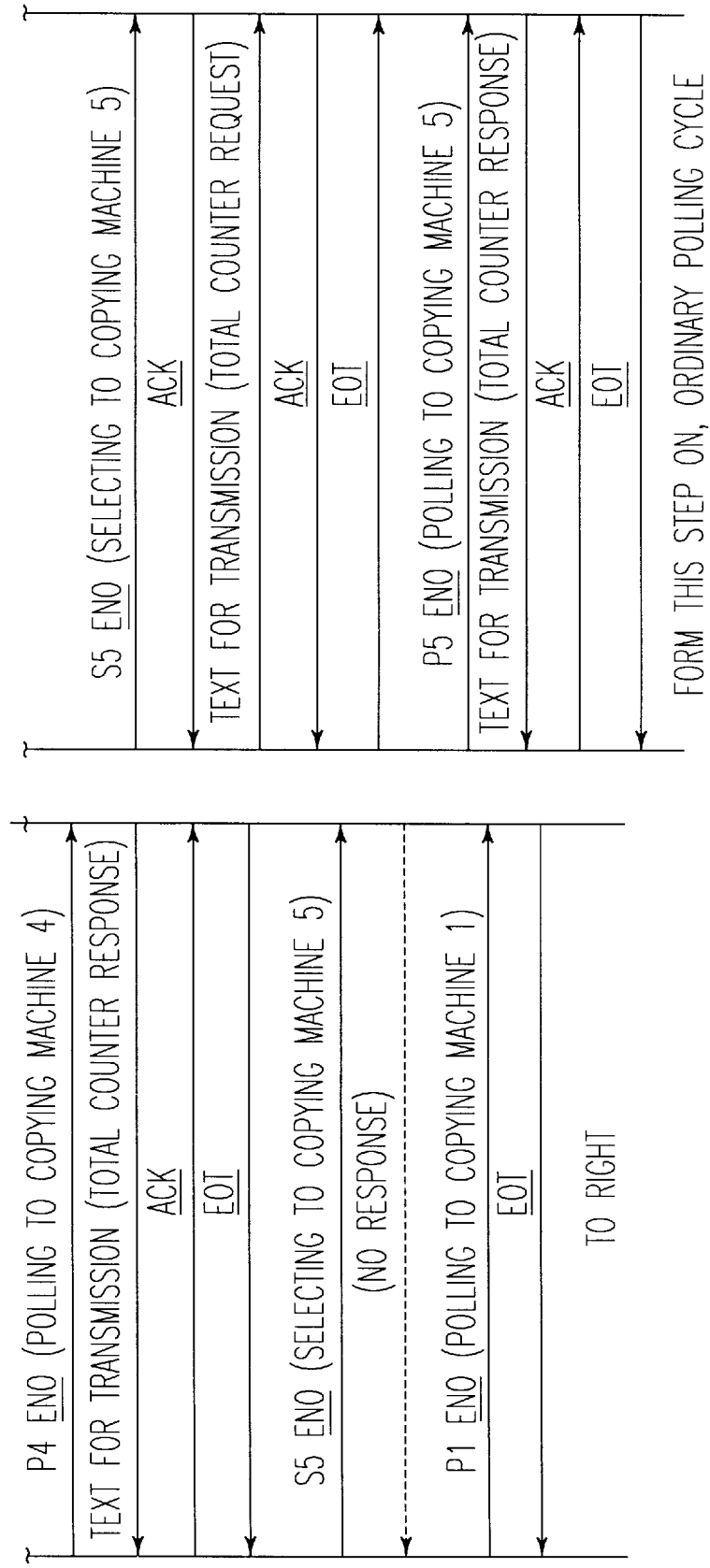

FIG. 33 shows another example of a communication sequence used when a total counter value is periodically transmitted to the unit. When it reaches the date and time when a total counter value is collected, the communication control unit 18 executes selecting in place of polling at a timing when polling is executed to each of copying machines. The copying machine which sends a response to the selecting is polled immediately after this step, and data is received by the copying machine.

A first cycle to copying machines at addresses 1 to 5 immediately after it becomes the collecting date and time for a total counter value is the same as that shown in FIG. 32, but a polling cycle is not inserted after the first cycle. In a second cycle, polling is executed to some of copying machines which has already received data, and selecting for requesting a counter value is executed again to a copying machine which could not receive the data. System control returns to the ordinary state in which only polling is executed at a point of time when data from all of the copying machines can be received.

This example is also a case, like that shown in FIG. 32, where at first, there was a response from copying machines at addresses 1, 3, 4, and data from a copying machine at address 2 among copying machines which could not receive the previous data was received in the next cycle, and data from all of the copying machines could be received in the following cycle.

Although the image forming apparatus administration system in the embodiment can provide a control to data from a plurality of copying machines 1 herein, a current type of copying machine has multi-functions such as a colored copy function or digital image forming function including one having only one unit of total counter and those having a plurality of units thereof mounted thereon. Up to 3 units of the total counter can be mounted on the copying machine in this embodiment. In this case, each data (a total counter value) is separated into each of the copying machines 1 and sent to the administrating device 16 of the center, which takes extra transmission costs, so that, when it has data to be transmitted, the data is put together for transmitting.

On the other hand, the communication control unit 18 in this embodiment has a function of temporarily storing data from each of the copying machines 1 and a function of originating a call to a sender of the call. Also when data is transmitted by utilizing a public line, a certain amount of communication charge is required according to a period of time when the line is used as well as to a distance of the call, and in personal computer communications which is currently well-used, such a system, in which lines are connected to each other each time when communication is executed, is employed, so that it is inconvenient for a user to pay a basic charge for the access (basic dialed-communication charge) every time even in a case of access for a short period, and for this reason, the communication control unit 18 has also a function of putting some inside data, which can be put into one and be sent at once, into one block and sending it in one operation in order to reduce the cost.

Furthermore, if a particular destination of a call is busy and new data to be sent to the same destination is received while waiting for a timing for reoriginating the call, a possibility to enable connection to the destination of the call is enhanced by initializing a counter for a number of times of reoriginated calls to the destination. It should be noted that the counter for a number of times of reoriginated calls may be counted up each time when the line is busy, or an initial value is set when originating a call for the first time, and then the value is counted down each time when the line is busy, and when the count value becomes "zero", the count value is detected and an error processing may be executed.

Next, a concrete description is made for a portion directly related to the present invention.

Figure 38:
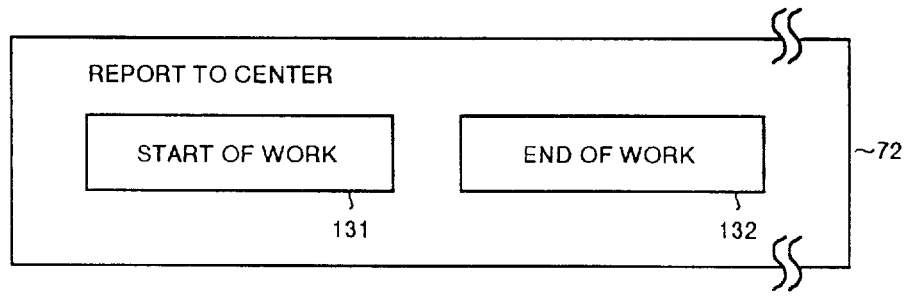
FIG. 38 is a view showing an example of a work screen displayed on the pattern display section 72 in the operating section shown in FIG. 3.

When a serviceman, before starting a maintenance work for a copying machine, presses a mode clear/preheating key 76 provided on the operating section 70 shown in FIG. 3, then inputs a prespecified secret number thereto with a ten-key 77, when a display screen on the pattern display section 72 is changed from a default screen shown in FIG. 4 to a work screen shown in FIG. 38.

Provided on this work screen are a work start key display section 131 for instructing start of a maintenance work for the copying machine 1 and a work end key display section 132 for instructing end of a maintenance work for the copying machine 1.

Figure 34:
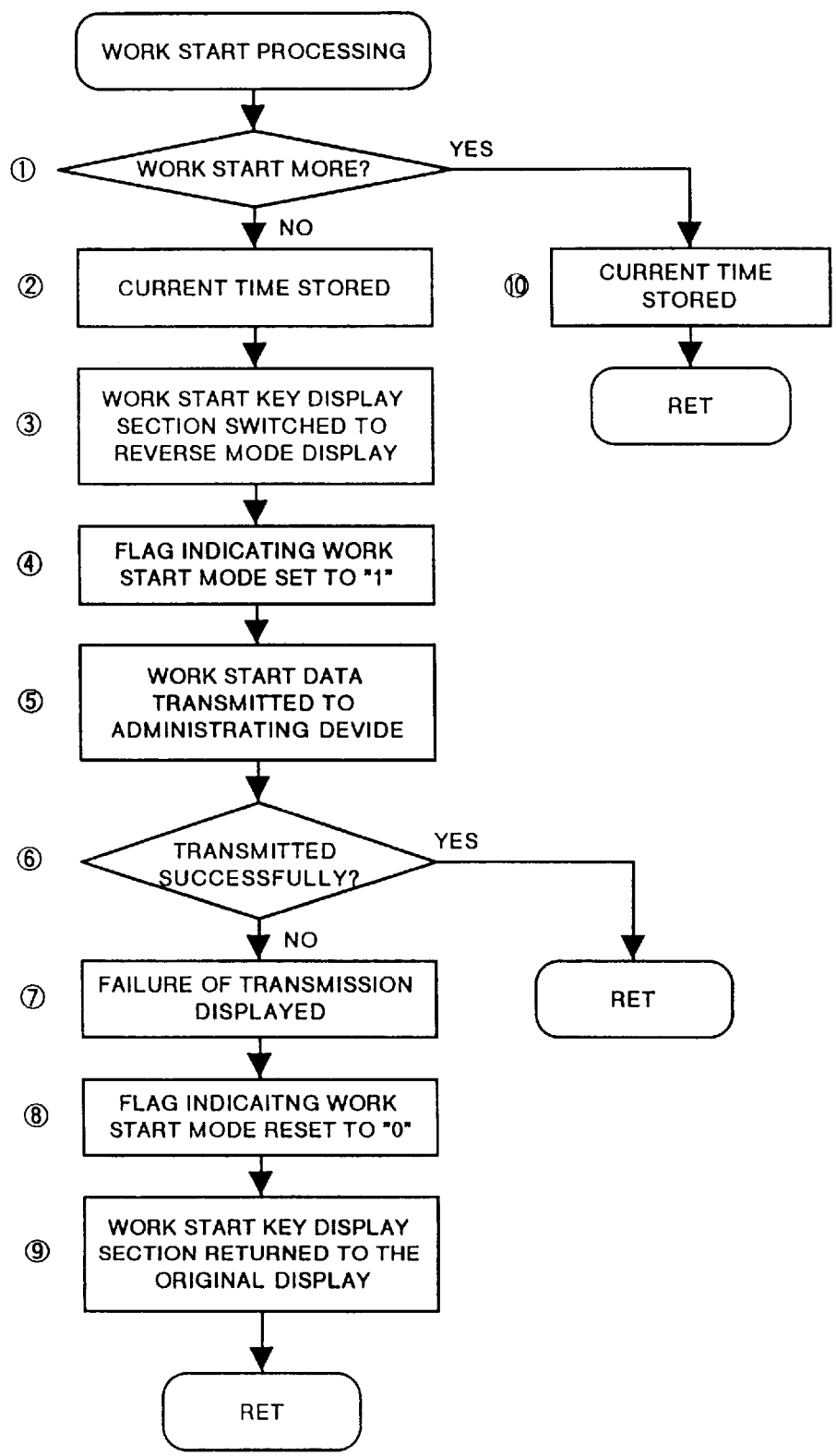
FIG. 34 is a flow chart showing a routine for work start processing according to the CPU in a copying machine.

FIG. 34 is a flow chart showing a routine for the work start processing routine by the CPU 100 in the copying machine 1 shown in FIG. 8.

This routine starts when the work start key display section 131 is pressed, in which at first, determination is made in Step 1 as to whether or not the current mode is the work start mode, and if it is determined the work start mode has already been selected, namely in a case where the work start key display section 131 has been pressed in the work start mode, the current time according to the clock 121 shown in FIG. 8 is stored in the RAM 102 (non-volatile), and the start processing is ended.

Figure 39:
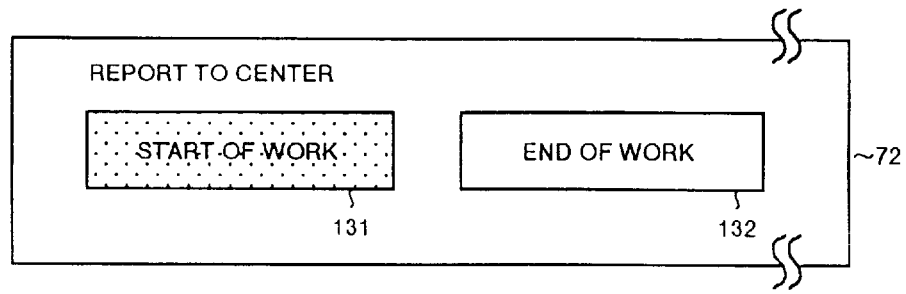
FIG. 39 is a view showing an example of a work screen when the work start key display section 131 shown in FIG. 38 is pressed.

In contrast, if the work start mode has not been selected yet, namely in a case where the work start key display section 131 is pressed for the first time, the current time is stored in the RAM 102 in Step 2, and the work start key display section 131 is changed to the display in reverse (the diagonally shaded area) as shown in FIG. 39 in Step 3 to inform the serviceman that the work start mode has been set.

Figure 37:
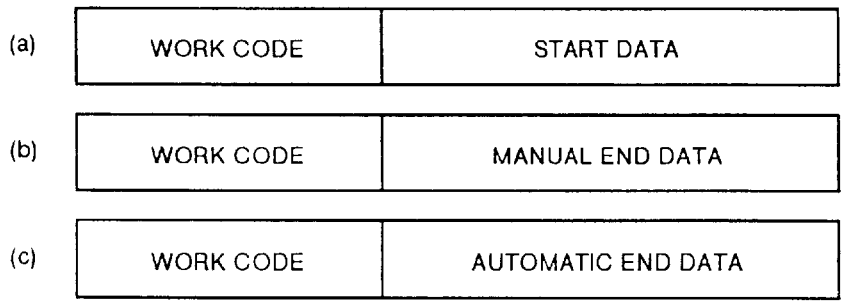
FIG. 37 is a view showing an example of a data format used when data for start of a work and data for end of the work are transmitted from a copying machine to the communication control unit.

Then, a flag indicating the work start mode on the RAM 102 is set to "1" in Step 4, and work start data shown in FIG. 37(*a*) is transmitted to the administrating device 16 shown in FIG. 5 by the communication interface unit 109 in Step 5. In this case, the communication control unit 18 receives the data and stores it once in the RAM 186 shown in FIG. 6, and transmits the data to the administrating device 16. Then data indicating communication result to the administrating device 16 is sent back to the copying machine 1.

After Step 5, determination is made as to whether or not the work start data has successfully been transmitted to the administrating device 16 according to data indicating the communication result from the communication control unit 18 in Step 6, and in a case where the data could successfully be transmitted, the processing is ended. In a case where the work start data could not successfully be transmitted, the data indicating the transmission failure is displayed on the prespecified area of the work screen, the work start mode is reset to "0" in Step 8, the work start key display section 131 is changed back to the default display screen (Refer to FIG. 38) in Step 9, and then the process is ended.

In a case where data indicating that the work start data could not successfully be transmitted is displayed on the work screen in this step, an operator may either press the work start key display section 132 again, or inform by telephone, that the work start data could not successfully be transmitted, to a supervisor in the service center where the administrating device 16 is provided.

Also, the flag indicating the work start mode is stored in the RAM 102, so that the data can be stored and kept as it is without being deleted even if the power to the copying machine 1 is cut. Form this reason, when the power to the copying machine is turned ON, and if the flag indicating the work start mode on the RAM 102 is set to "1", data indicating that the copying machine is in the work start mode is informed to the serviceman by displaying the work screen shown in FIG. 39 on the pattern display section 72 shown in FIG. 3.

Figure 35:
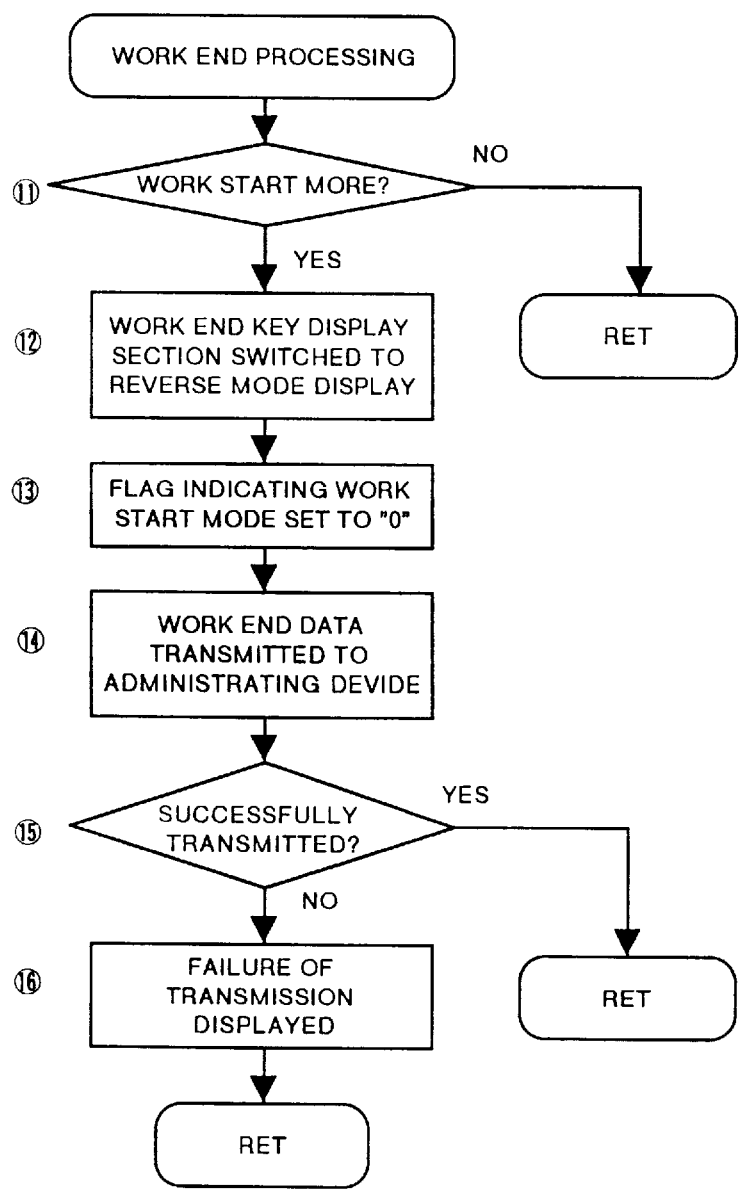
FIG. 35 is a flow chart also showing a routine for work end processing according to the CPU in the copying machine.

FIG. 35 is a flow chart showing a routine for a work end processing by the CPU 100 of a copying machine 1 shown in FIG. 8.

In this routine, when the work end key display section 132 is pressed, the operation is started, and at first, determination is made as to whether or not the current mode is the work start mode in Step 11, and if the machine is not in the work start mode, the processing is ended at once.

Also if the current mode is the work start mode, namely in a case where the work end key display section 132 has pressed in the work start mode, the work end key display section 132 on the work screen is changed to the reverse display (the shaded area) in Step 12 to inform to an operator that the work start mode has been released. In this step, the work start key display section 131 is returned to the ordinary display.

Then, a flag indicating the work start mode on the RAM 102 is reset to "0" in Step 13, and work end data shown in FIG. 37(*b*) is transmitted to the administrating device 16 by the communication interface unit 109 in Step 14. In this case, the communication control unit 18 receives the work end data and stores it once in the RAM 186 shown in FIG. 6, and transmits the data to the administrating device 16. Then data indicating communication result to the administrating device 16 is returned to the copying machine 1.

After Step 14, determination is made as to whether or not the work end data could successfully be transmitted to the administrating device 16 according to the data indicating the communication result sent from the communication control unit 18 in Step 15, and in a case where the data could successfully be transmitted, the processing is ended, and in a case where the data could not successfully be transmitted, the data indicating the failure is displayed on the prespecified area of the work screen in Step 16, and the processing is ended.

It should be noted that, in a case where data indicating that the work end data could not successfully be transmitted is displayed on the work screen in this step, the operator may either press the work end key display section 131 again, or inform by telephone that the work end data could not successfully be transmitted, to a supervisor in the service center where the administrating device 16 is provided.

Figure 36:
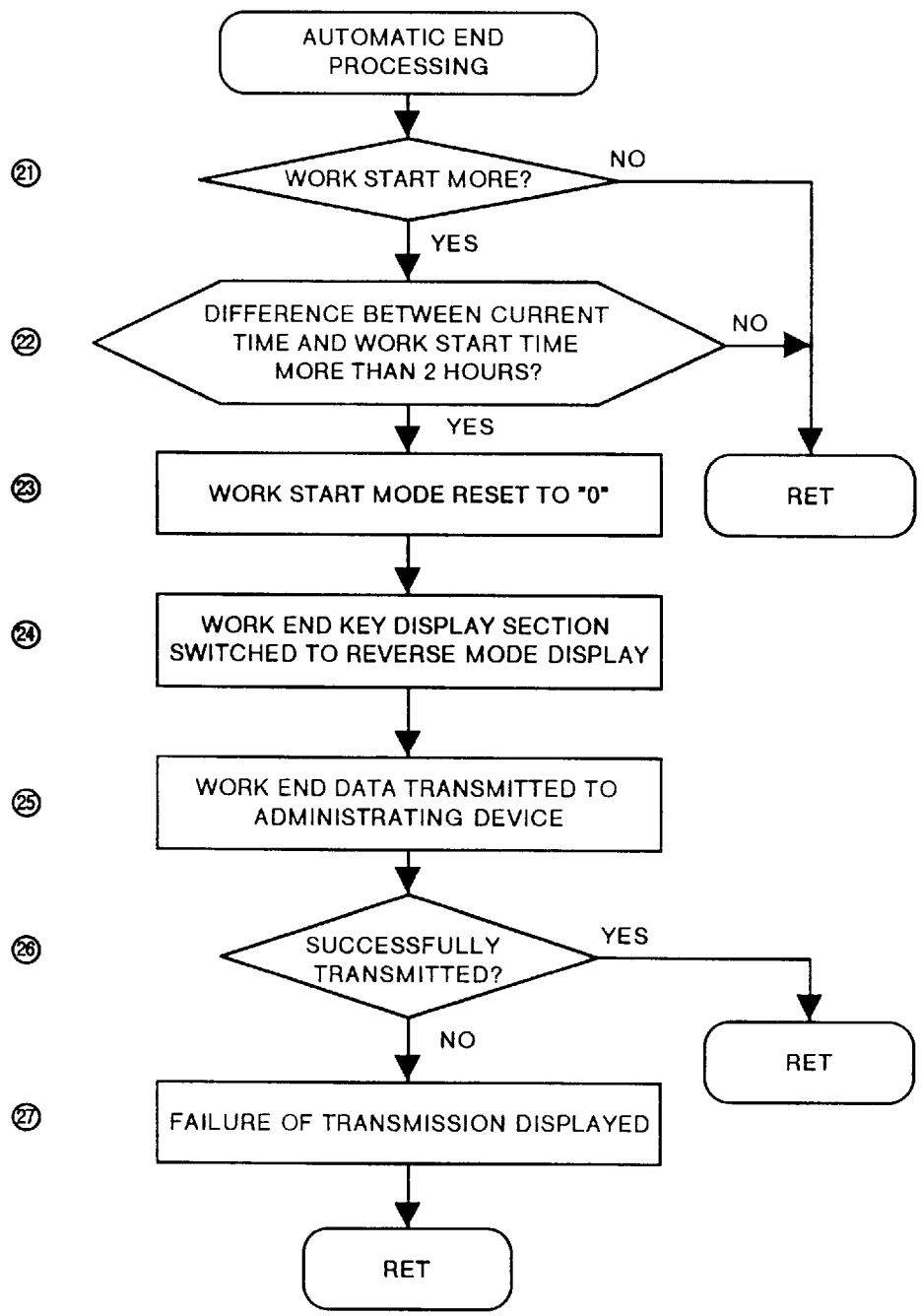
FIG. 36 is a flow chart also showing a routine for automatic end processing according to the CPU in the copying machine.

FIG. 36 is a flow chart showing a routine for an automatic end processing by the CPU 100 of the copying machine 1 shown in FIG. 8.

This routine corresponds to a case where the serviceman forgets to press the work end key display section 132 on the work screen, and when the power to the copying machine is turned ON, the CPU 100 shown in FIG. 8 has this routine periodically started.

At first, determination is made as to whether or not the current mode is the work start mode in Step 21, and if it is determined that the machine is not in the work start mode, the processing is ended at once, and if it is determined that the current mode is the work start mode, system control shifts to Step 22, and determination is made as to whether a difference between the current time according to the clock 121 in FIG. 8 and the time (work start time) stored in the RAM 102 in Step 2 or Step 10 in FIG. 34 is more than 2 hours (whether a period of time measured from a point of time when the work is started according to the clock 121 has reached 2 hours) or not.

If the difference is less than 2 hours, the processing is ended, but if the difference is more than 2 hours, it is determined that the serviceman forgot to press the work end key display section 132, the flag indicating a work start mode is reset to "0" in Step 23, and the work end key display section 132 is changed to the reverse display in Step 24. In this step, the work start key display section 131 is returned to the default display.

Then in Step 25, the work end data shown in FIG. 37(c) is transmitted to the administrating device 16. In this case, the communication control unit 18 receives the work end data and stores it once in the RAM 186 shown in FIG. 6, and transmits the data to the administrating device 16. Then data indicating communication result to the administrating device 16 is returned to the copying machine 1.

After Step 25, determination is made as to whether or not the work end data could successfully be transmitted to the administrating device 16 according to the data indicating the communication result sent from the communication control unit 18 in Step 26, and in a case where the data could successfully be transmitted, the processing is ended, and in a case where the data could not successfully be transmitted, the data indicating the failure is displayed on the prespecified area of the work screen in Step 27, and the processing is ended.

Although the prespecified period of time (2 hours) from the time when a maintenance work start is instructed with the work start key display section 131 (the time stored in the RAM 102 in Step 2 or in Step 10 shown in FIG. 34) until the time when the work end data is automatically transmitted is stored in the RAM 102, the prespecified period of time is not stored when a power to the copying machine 1 is turned ON for the first time. For this reason, when the power is turned ON, or when a forced initialization signal is received, the CPU 100 may execute the initialization to store an initial value for the prespecified period of time in the RAM 102.

Namely, during the initialization, it is determined whether or not the prespecified period of time has been stored in the data storing area in the RAM 102 according to whether or not the data obtained by reading it in the particular area of the RAM 102 coincides with the particular data (e.g. numeric characters such as "1994" or a character array "a b c d e" or some other ones), and if it is determined that the prespecified period of time has not been stored therein (in a case where the power to a copying machine is turned ON for the first time), an default value for the prespecified period of time (time previously set) is stored in the data storing area and particular data is stored in the particular area respectively, and then the rest of the area excluding the data storing area and the particular area in the RAM 102 is initialized.

From this step and on, when the machine is initialized after the power to the copying machine 1 is cut and is turned ON again, the particular data can be read out from the particular area in the RAM 186, so that it is determined that the prespecified period of time is stored in the data storing area, and data for the period of time is kept stored as it is. The prespecified period of time can be rewritten by delivering item code for rewriting a time and a value for the time each written with the format shown in FIG. 16 to the administrating device when a Write processing is executed from the administrating device 16 to the copying machine 1. Namely, the prespecified period of time can be set to any arbitrary value. Also, the period of time can be set to any arbitrary value according to an operation signal issued from the operating section 70 in the copying machine 1.

Figure 40:
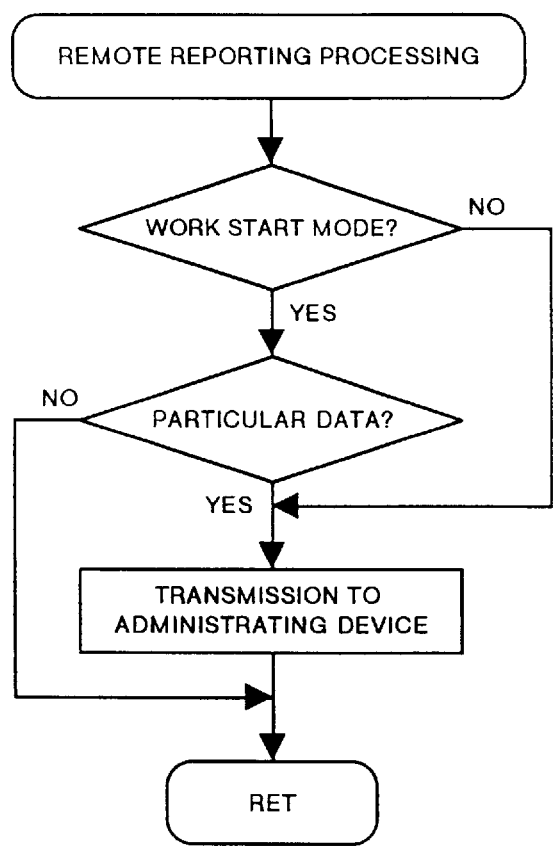
FIG. 40 is a flow chart showing general contents of a remote reporting processing according to the CPU in a copying machine.

Finally, more simple description is made for the remote reporting according to the present invention with reference to FIG. 40.

FIG. 40 is a flow chart showing outline of a remote reporting processing according to the CPU 100 in the copying machine 1 shown in FIG. 8.

This routine starts when the communication permission switch 111 provided outside the operating section 70 in the copying machine 1 is ON, and when transmission (reporting) of remote reporting data is requested, namely in any cases where the report reporting key 83 in the operating section 70 is pressed, where generation of any abnormality is detected by the self-diagnosis function, or where the machine requires to issue an advance alarm, and at first determination is made as to whether or not the machine is in the work start mode, and if not in the work start mode, the requested remote reporting data is transmitted to the administrating device 16 through the communication control unit 18.

If the mode is the work start mode, determination is made as to whether or not the remote reporting data requested to be transmitted is particular data, namely whether or not the data is remote reporting data, excluding one due to abnormality detected in self-diagnosis, which is data indicating abnormality, entered with the remote reporting key 83, or whether or not the data is the remote reporting data according to an advance alarm for which a serviceman may not be dispatched, and if the data is particular data, the data is transmitted to the administrating device 16 through the communication control unit 18, and if the data is not particular one but data indicating abnormality, the processing is ended as it is (the transmission to the communication control unit 18 is inhibited).

As described above, in the image forming apparatus administration system according to the embodiment, the CPU 100 in the copying machine 1 transmits, when an instruction for start of a maintenance work is issued by the work start key display section 131 shown in FIG. 38, work start data to the administrating device 16 (service center), and when an instruction for end of the maintenance work is issued by the work end key display section 132, work end data is transmitted to the administrating device 16, so that a serviceman can smoothly report from a customer's site to the service center at any time before a maintenance work for a copying machine is started and after the work is ended without utilizing a telephone set at the customer's site or one outside the costumer sites.

In a case where time measurement is started by using the clock 121 in FIG. 8 when an instruction for start of a maintenance work is issued by the work start key display section 131, and an instruction for end of the work is not issued even when the measured period of time reaches a prespecified period of time, maintenance work end data is automatically transmitted to the administrating device 16, so that even in a case where the serviceman forgets to report that the maintenance work for the copying machine has been ended from a customer's site to the service center, any inconvenience in relation to management for the machine is not generated in the side of service center.

Further, contents of the work end data transmitted by the work end key display section 131 and that of the work end data which is automatically transmitted are different from each other as shown in FIG. 37(b) and FIG. 37(c), so that the service center can easily determine whether or not the serviceman has reported thereto that the maintenance work has ended, namely whether the serviceman has forgotten to report it thereto or not.

In addition, a prespecified period of time from a point of time when an instruction for start of a maintenance work is issued by the work start key display section 131 to a point of time when work end data is automatically transmitted can be set to any arbitrary value, so that the prespecified period of time described above can be set to the most suited value to any skill or some other conditions which each of the servicemen has.

The clock 121 is backed up, so that work end data can be automatically transmitted to the administrating device 16 after the prespecified period of time even if a power is disconnected during the time measurement.

Further, reception of an instruction for start of a next maintenance work is inhibited after an instruction for start of a maintenance work is once received until a point of time when an instruction for end of the maintenance work is issued or until a period of time measured by using the clock 121 reaches the prespecified period of time, so that even in a case where the serviceman accidentally touches the work start key display section 131 while the maintenance work is executed according to the default instruction for start of the maintenance work, the work start data (unnecessary data) is not transmitted to the administrating device 16.

Furthermore, transmission of data indicating abnormality (remote reporting data concerning abnormality detected in self-diagnosis) to the communication control device 18 is inhibited (the function of remote reporting is turned OFF) in a case where any abnormality is generated during a time from a point of time when an instruction for start of a maintenance work is issued until a point of time when an instruction for end of the maintenance work is issued, or until a period of time measured by using the clock 121 reaches the prespecified period of time, so that it can also be avoided that a supervisor in the service center arranges other serviceman to be sent because data indicating abnormality generated by mistake while the serviceman is checking his operations or something else is transmitted to the administrating device 16.

In a case where transmission of particular data (data such as remote reporting data by the remote reporting key 83 or remote reporting data for an advance alarm, for which the service center will not arrange a serviceman to be sent) excluding the data indicating abnormality described above is requested during a time from a point of time when an instruction for start of a maintenance work is issued by the work start key display section 131 until a point of time when an instruction for end of the maintenance work is issued by the work end key display section 132, or until the period of time measured by using the clock 121 reaches the prespecified period of time, the particular data is transmitted to the administrating device, so that there is much less possibility that any inconvenience in relation to management for the machine, such as a case where a user can not immediately use the copying machine 1 due to shortage of toner or paper after the serviceman has completed the maintenance work to the copying machine 1, is generated.

As described above, the image forming apparatus administration system according to the present invention is applicable to an image forming apparatus administration system in which a plurality of copying machines and an administrating device are connected through a communication control unit and a public line network, and is also applicable to an image forming apparatus administration system in which each of image forming apparatuses other than copying machines and an administrating device are connected through a communication control unit and a public line network.

I claim:

1. An image forming apparatus administration system in which a plurality of image forming apparatuses and an administrating device are connected through a communication control unit and a public line network so that said plurality of image forming apparatuses can be put under centralized management, wherein at least one of said plurality of image forming apparatuses comprises:

a work start instructing means for instructing a start of a maintenance work;

a work start data transmitting means for transmitting work start data, when the start of the maintenance work is instructed by said work start instruction means, to said administrating device;

a work end instructing means for instructing an end of the maintenance work;

a work end data transmitting means for transmitting work end data, when the end of the maintenance work is instructed by said work end instructing means, to said administrating device;

a time measuring means for measuring time; and a work end data automatically transmitting means for having time measurement by said time measuring means started when the start of the maintenance work is instructed by said work start instructing means and for automatically transmitting the work end data to said administrating device in a case when the end of the maintenance work is not instructed by said work end instructing means even when the measurement time reaches a prespecified period of time.

2. An image forming apparatus administrating system according to claim 1, wherein said work end data transmitting means and said work end data automatically transmitting means transmits work end data having different contents respectively.

3. An image forming apparatus administrating system according to claim 2, wherein said at least one of the plurality of image forming apparatuses further comprises a means for inhibiting reception of an instruction for start of a next maintenance work after the start of the maintenance work is once received from said work start instructing means until a point of time when the end of the maintenance work is instructed by said work end instructing means.

4. An image forming apparatus administrating system according to claim 1, further comprising a means for arbitrarily setting a period of time from a point of time when the start of the maintenance work is instructed by said work start instructing means until a point of time when the work end data is automatically transmitted by said work end data automatically transmitting means.

5. An image forming apparatus administrating system according to claim 1, wherein said at least one of the plurality of image forming apparatuses further comprises a means for backing up said time measuring means.

6. An image forming apparatus administrating system according to claim 1, wherein said at least one of said plurality of image forming apparatuses further comprises a means for inhibiting reception of an instruction for start of a next maintenance work after the start of the maintenance work is once received from said work start instructing means until the end of the maintenance work is instructed by said work end instructing means, or until a period of time measured by said time measuring means reaches a prespecified period of time.

7. An image forming apparatus administrating system according to claim 1, wherein said at least one of said plurality of image forming apparatuses further comprises a means for inhibiting transmission of data indicating abnormality, when any abnormality is generated during a time from a point of time when the start of the maintenance work is instructed by said work start instructing means until a point of time when the end of the maintenance work is instructed by said work end instructing means, to said communication control unit.

8. An image forming apparatus administrating system according to claim 7, wherein said at least one of said plurality of image forming apparatuses further comprises a means for transmitting, when transmission of particular data excluding said data indicating abnormality is requested during the time from the point of time when the start of the maintenance work is instructed by said work start instructing means until the point of time when the end of the maintenance work is instructed by said work end instructing means, the particular data to said administrating device.

9. An image forming apparatus administrating system according to claim 1, wherein at least one of said plurality of image forming apparatuses further comprises a means for inhibiting transmission of data indicating abnormality to said communication control device in a case where any abnormality is generated during a from a point of time when the start of a maintenance work is instructed by said work start instructing means until a point of time when the end of the maintenance work is instructed by said work end instructing means or until a period of time measured by said time measuring means reaches a prespecified period of time.

10. An image forming apparatus administrating system according to claim 9, wherein said at least one of said plurality of image forming apparatuses further comprises a means for transmitting, when transmission of particular data excluding said data indicating abnormality is requested during the time from the point of time when the start of the maintenance work is instructed by said work start instructing means until the point of time when the end of the maintenance work is instructed by said work end instructing means or until the period of time measured by said time measuring means reaches the prespecified period of time, the particular data of said instructing device.

11. An image forming apparatus administration system in which a plurality of image forming apparatuses and an administrating device are connected through a communication control unit and a public line network so that said plurality of image forming apparatuses can be put under centralized management, wherein at least one of said plurality of image forming apparatuses comprises:

a work start instructing means for instructing a start of a maintenance work;

a work start data transmitting means for transmitting work start data, when the start of the maintenance work is instructed by said work start instruction means, to said administrating device;

a work end instructing means for instructing an end of the maintenance work;

a work end data transmitting means for transmitting work end data, when the end of the maintenance work is instructed by said work end instructing means, to said administrating device;

a means for inhibiting transmission of data indicating abnormality, when any abnormality is generated during a time from a point of time when the start of the maintenance work is instructed by said work start instructing means until a point of time when the end of the maintenance work is instructed by said work end instructing means, to said communication control unit; and a means for transmitting, when transmission of particular data excluding said data indicating abnormality is requested during the time from the point of time when the start of the maintenance work is instructed by said work start instructing means until the point of time when the end of the maintenance work is instructed by said work end instructing means, the particular data to said administrating device.

* * * * *